United States Patent
Guo et al.

(10) Patent No.: US 9,930,651 B2
(45) Date of Patent: Mar. 27, 2018

(54) DOWNLINK CONTROL INFORMATION CONFIGURATION AND ACQUISITION METHOD, BASE STATION AND TERMINAL

(71) Applicant: ZTE CORPORATION, Shenzhen, Guangdong (CN)

(72) Inventors: Senbao Guo, Shenzhen (CN); Yunfeng Sun, Shenzhen (CN); Junfeng Zhang, Shenzhen (CN); Dongli Chen, Shenzhen (CN)

(73) Assignee: ZTE CORPORATION (CN)

( * ) Notice: Subject to any disclaimer, the term of this patent is extended or adjusted under 35 U.S.C. 154(b) by 239 days.

(21) Appl. No.: 14/439,784

(22) PCT Filed: Aug. 26, 2013

(86) PCT No.: PCT/CN2013/001014
§ 371 (c)(1),
(2) Date: Apr. 30, 2015

(87) PCT Pub. No.: WO2014/067232
PCT Pub. Date: May 8, 2014

(65) Prior Publication Data
US 2015/0334683 A1   Nov. 19, 2015

(30) Foreign Application Priority Data
Oct. 31, 2012   (CN) .......................... 2012 1 0428132

(51) Int. Cl.
*G01R 31/08* (2006.01)
*H04L 5/14* (2006.01)
(Continued)

(52) U.S. Cl.
CPC ........... *H04W 72/042* (2013.01); *H04L 5/005* (2013.01); *H04L 5/0035* (2013.01);
(Continued)

(58) Field of Classification Search
CPC ............. H04W 72/085; H04W 72/082; H04W 72/0453; H04L 5/0062; H04L 5/0057
See application file for complete search history.

(56) References Cited

U.S. PATENT DOCUMENTS 8,259,601 B2 *  9/2012  Fu ....................... H04W 72/082
370/252
2011/0235743 A1   9/2011  Lee et al.
(Continued)

FOREIGN PATENT DOCUMENTS

CN   101541063 A   9/2009
CN   102036305 A   4/2011
(Continued)

OTHER PUBLICATIONS

Partial Supplementary European Search Report for European application No. 13851763.6, Completed by the European Patent Office, dated Oct. 15, 2015, 5 Pages.
(Continued)

*Primary Examiner* — Brian Roberts
*Assistant Examiner* — Abu-Sayeed Haque
(74) *Attorney, Agent, or Firm* — Plumsea Law Group, LLC

(57) ABSTRACT

Disclosed are a downlink control information configuration and acquisition method, a base station and a terminal, wherein the base station configures a plurality of sets of receiving information for the terminal via a terminal specific high-layer signaling, and the base station indicates, to the terminal, which set in the plurality of sets of receiving information to use to perform a DMRS and/or physical downlink shared channel (PDSCH) reception by using at least one of the following information: a localized virtual resource block/distributed virtual resource block assignment (LVRB/DVRB) bit in the DCI Format 1A; a control channel mode where the DCI Format 1A is located, PDCCH and
(Continued)

ePDCCH; an ePDCCH transmission mode where the DCI Format 1A is located, diversity transmission mode and localized transmission mode; and an ePDCCH cluster where the DCI Format 1A is located.

2 Claims, 1 Drawing Sheet

(51) Int. Cl.
  *H04B 7/00* (2006.01)
  *H04L 12/28* (2006.01)
  *H04W 72/04* (2009.01)
  *H04L 5/00* (2006.01)
  *H04B 7/06* (2006.01)
  *H04B 7/024* (2017.01)

(52) U.S. Cl.
  CPC .......... *H04L 5/0048* (2013.01); *H04L 5/0053* (2013.01); *H04B 7/024* (2013.01); *H04B 7/0689* (2013.01)

(56) References Cited

U.S. PATENT DOCUMENTS

| | | | |
|---|---|---|---|
| 2011/0237283 A1 | 9/2011 | Shan et al. | |
| 2012/0188978 A1 | 7/2012 | Yan et al. | |
| 2012/0307757 A1* | 12/2012 | Edler Von Elbwart | H04L 1/0026 370/329 |
| 2013/0044727 A1* | 2/2013 | Nory | H04L 5/0092 370/330 |
| 2013/0208604 A1* | 8/2013 | Lee | H04L 25/0226 370/252 |
| 2014/0119261 A1* | 5/2014 | Wang | H04W 72/04 370/312 |
| 2015/0327047 A1* | 11/2015 | Tiirola | H04W 8/005 370/338 |

FOREIGN PATENT DOCUMENTS

| | | |
|---|---|---|
| CN | 102404854 A | 4/2012 |
| CN | 102685795 A | 9/2012 |

OTHER PUBLICATIONS

ZTE 3GPP TSG RAN WG1 Meeting No. 70, R123318, Dated Aug. 13-17, 2012, 7 Pages, "Remaining issues for downlink reference signals for CoMP".

ZTE et al 3GPP TSG RAN WG1 #70bis, R1-124623, Dated Oct. 8-12, 2012, 4 Pages, "Way Forward on downlink control signalling for PDSCH RE mapping and quasi-co-location of CSI-RS and DMRS for TM10".

PCT Written Opinion of the International Searching Authority dated Nov. 21, 2013, Application No. PCT/CN2013/001014, Applicant ZTE Corporation.

PCT International Search Report dated Nov. 21, 2013, Application No. PCT/US2013/001014.

PCT Written Opinion of the International Searching Authority dated Nov. 21, 2013, Application No. PCT/CN2013/001014, Applicant ZTE Corporation, 5 Pages.

PCT International Search Report dated Nov. 21, 2013, Application No. PCT/US2013/001014, 4 Pages.

* cited by examiner

DOWNLINK CONTROL INFORMATION CONFIGURATION AND ACQUISITION METHOD, BASE STATION AND TERMINAL

CROSS-REFERENCE TO RELATED APPLICATIONS

This application is a U.S. national phase of PCT Application No. PCT/CN2013/001014 filed Aug. 26, 2013, which claims priority to Chinese Application No. 201210428132.5 filed Oct. 31, 2012, the disclosures of which are incorporated in their entirety by reference herein.

TECHNICAL FIELD

The present invention document relates to the field of communications, and more particularly, to a method for configuring and acquiring downlink control information, a base station and a terminal.

BACKGROUND OF THE RELATED ART

After experienced the R8/9/10 versions, the Long Term Evolution (referred to as LTE) system has been successively and accurately studying the R11 technology. Currently, some of R8 products have gradually become commercial, while R9 and R10 are to be further product planned.

After experienced the R8 and R9 stages, based on which the R10 added many new features, such as DMRS (Demodulation Reference Signal), CSI-RS (Channel State Information Reference Signal) and other pilot characteristics, and transmission and feedback characteristics such as eight antenna support, in particular, the eICIC (enhanced Inter-Cell Interference Cancelling) technology further considers inter-cell interference cancelling technology on the basis of considering the R8/9 ICIC (Inter-Cell Interference Cancelling). The inter-cell interference cancelling technology mainly focused on the cell interference cancelling in the homogeneous network at the early stage of the R10, and the mainstream consideration was the eICIC technology and the CoMP (Coordinated Multi-point) technology. The name of CoMP suggests that multiple nodes coordinate to send data to one or more UEs (User Equipment) in the same time-frequency resource or different time-frequency resources. Such a technology can reduce inter-cell interference, improve throughput at the edge of the cell and expand the cell coverage. However, considering that the heterogeneous network has introduced more scenarios at the later stage of discussion, and the complexity of CoMP technology and time limitation of the R10 discussion finally determine that no additional CoMP standardized contents would be introduced at the R10 stage, but the demands of the CoMP part can be considered when designing the CSI-RS, so that there is no further discussion on the CoMP technology after the 60bis meeting.

The CoMP transmission mode mainly comprises JT (Joint Transmission), CS (Coordinated Scheduling)/CB (Coordinated Beamforming). For the JT, because different TPs (Transmission Points) transmit data for one UE, at this time, it needs to further study that the UE needs to generate the DMRS sequence according to the cell ID of which TP. Because the UE can generate the DMRS sequence according to the cell ID of the synchronous or serving cell in the R10 system, it does not involve in the problem of generating different sequences according to different IDs. The UE uses the cell ID to first generate a pseudo-random sequence initial value $c_{init}$ that is a must for generating the DMRS sequence:

$$c_{init} = (\lfloor n_s/2 \rfloor + 1) \cdot (2X+1) \cdot 2^{16} + n_{SCID}, \quad n_{SCID}=0 \text{ or } 1 \quad \text{(Eq. 1)}$$

uses the $c_{init}$ to generate the pseudo-random sequence $r_{n_s}(m)$ according to the method in section 7.2 of the 3GPP LTE 36.211, and then uses the equation $$r(m) = \frac{1}{\sqrt{2}}(1 - 2 \cdot c(2m)) + j\frac{1}{\sqrt{2}}(1 - 2 \cdot c(2m+1)), \quad \text{(Eq. 2)}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

to generate a DMRS reference signal sequence. Wherein $n_s$ is a timeslot index in a radio frame, $X=N_{ID}^{cell}$ is the cell ID, $n_{SCID}$ is a scrambling code identity, $c(2m)$ is a pseudo-random sequence generated with $c_{init}$, and $r(m)$ is the generated DMRS sequence.

For the R11, taking into account different nodes dynamically switched to different TPs or having different IDs of different cells, and considering that the R11 or R10 users switched to the TPs use the MU-MIMO (Multi User Multi-Input Multi-Output) technology to transmit data to save resources, then the DMRS sequences of the MU-MIMO users being identical can be better for different DMRS orthogonality and different users using the MMSE (Minimum mean-square error) technique to cancel the interference between the matched users, so as to achieve the accuracy of data reception and further improve the capacity of system. On the other hand, consider in the scenario of Scenario 4, since different nodes in the same Cell have the same ID (IDentity), then the UEs which are located in these nodes and configured with the TM8 (Transmission Mode 8) or the TM9 (Transmission Mode 9) can only use the $n_{SCID}$ to select two scrambling codes to limit the cell division gain in the Scenario 4. The latest 68 meeting proposed to use the high-layer semi-static signaling and/or physical layer dynamic signaling to inform the UE DMRS sequence to generate an ID, so as to enable the switching effect of dynamic orthogonality of interferences between one UE and other UEs and interference randomization.

For a UE with the configuration of TM9, it needs to detect two DCI (Downlink Control Information) Formats, one is DCI Format 1A and the other one is DCI Format 2C, in the PDCCH (Physical Downlink Control CHannel) or ePDCCH (Enhanced Physical Downlink Control Channel) region.

The DCI format 1A is mainly composed of the following information elements:
carrier indication field—0 or 3 bits;
Format0/Format1A discrimination bit—1 bit, the value 0 indicates the format 0, and the value 1 indicates the format 1A;
if the Format 1A is used for the initialization of a random access process, and the CRC (Cyclic Redundancy Check) of the format 1A uses the C-RNTI (Cell Radio Network Temporary Identifier) to scramble, the remaining bit distribution is:
localized/distributed VRB (Virtual Resource Block) assignment identity—1 bit, set to '0'.
resource block assignment—$\lceil \log_2(N_{RB}^{DL})(N_{RB}^{DL}+1)/2) \rceil$ bits, all bits are set to 1
Preamble index indicator—6 bits
PRACH (Physical Random Access Channel) mask index indicator—4 bits Remaining bits are set to 1

Otherwise, comprising:

a localized/distributed VRB assignment identity—1 bit resource block assignment—$\lceil \log_2(N_{RB}^{DL}(N_{RB}^{DL}+1)/2) \rceil$ bits Wherein, for the localized VRB, it is $\lceil \log_2(N_{RB}^{DL}(N_{RB}^{DL}+1)/2) \rceil$ bits;

for the distributed VRB:

if $N_{RB}^{DL}<50$ or if the CRC of the format 1A is scrambled by the RA-RNTI, P-RNTI or SI-RNTI, it is $\lceil \log_2(N_{RB}^{DL}(N_{RB}^{DL}+1)/2) \rceil$ bits;

otherwise, 1-bit MSB indicates a gap value, the value 0 indicates $N_{gap}=N_{gap,1}$, and the value 1 indicates $N_{gap}=N_{gap,2}$; ($\lceil \log_2(N_{RB}^{DL}(N_{RB}^{DL}+1)/2) \rceil-1$) bits $N_{gap}$ is the gap between the physical resource block and the virtual resource block index when the physical resource block maps to the virtual resource block.

modulation and coding scheme—5 bits

HARQ process number—3 bits (FDD system), 4 bits (TDD system)

New data indicator—1 bit

Wherein, if the CRC of the format 1A is scrambled by the RA-RNTI, P-RNTI or SI-RNTI, then:

if $N_{RB}^{DL}\geq50$ and the localized/distributed VRB assignment identity is set to 1, the new data indicator bit indicates the value of gap, wherein the value 0 indicates $N_{gap}=N_{gap,1}$, and the value 1 indicates $N_{gap}=N_{gap,2}$.

Otherwise, the new data indicator field is reserved;

If the CRC of the format 1A is not scrambled by the RA-RNTI, P-RNTI or SI-RNTI, then: the new data indicator field is used to indicate whether it is new data or not.

Redundancy version—2 bits

PUCCH (Physical Uplink Control CHannel) TPC (Transmit Power Control) command—2 bits wherein, if the CRC of the format 1A is scrambled by the RA-RNTI, P-RNTI or SI-RNTI, then:

1) the MSB of the TPC command is reserved 2) the LSB of the TPC command indicates the column of the TBS table.

3) if the value of LSB is 0, then $N_{PRB}^{1A}=2$, otherwise $N_{PRB}^{1A}=3$.

If the CRC of the format 1A is not scrambled by the RA-RNTI, P-RNTI or SI-RNTI, then: the two bits of the PUCCH TPC command comprise the MSB indicator and the TPC command.

downlink assignment index (this field exists in all the uplink and downlink configurations of the TDD, and only applies to the TDD uplink and downlink configurations 1-6, and this field does not exist in the FDD)—2 bits.

SRS (Sounding Reference Signal) request field, 0 or 1 bit, and this field only appears in the DCI format which is scrambled by the C-RNTI and used to schedule the PDSCH (Physical Downlink Shared Channel) in the UE-specific search space.

When the CRC of the format 1A is scrambled by the RA-RNTI, P-RNTI or SI-RNTI, the following fields will be reserved:

HARQ process number downlink assignment index

The DCI Format 2C comprises:

carrier indicator field (a UE configured with multi-carrier aggregation needs to detect this bit).

resource assignment type indicator, used to indicate the UE whether the resource assignment type used by the base station side to transmit data is the resource assignment type 0 or 1. If the downlink bandwidth is less than or equal to 10 RBs (Resource Blocks), there is no resource assignment header field.

Resource assignment bit field.

Transmit power control bit field, used for the PUCCH power control.

Downlink assignment index. This field only exists in the TDD system;

HARQ (Hybrid Adapt Retransmission Request) process indicator number.

Antenna port, scrambling code identity and the number of layers indicator field.

SRS request field.

TB (Transmission Block) information indicator field:

TB 1:

Modulation and coding scheme indicator field

New data indicator field (NDI)

Redundancy version indicator field $rv_{idx}$

TB 2:

Modulation and coding scheme indicator field $I_{MCS}$

New data indicator field (NDI)

Redundancy version indicator field $rv_{idx}$

If both transport blocks are enabled, then the TB1 is mapped to codeword 0, and the TB2 is mapped to codeword 1. If only one TB is enabled, the mapping from the TBs to the codewords is shown in Table 1.

TABLE 1 mapping of transport block to codeword (single transport block is enabled).

| transport block 1 | transport block 2 | codeword 0 (enabled) | codeword 1 (disabled) |
|---|---|---|---|
| enabled | disabled | transport block 1 | — |
| disabled | enabled | transport block 2 | — |

For the single enabled codeword, the values 4, 5 and 6 in Table 2 only support retransmissions which use the 2, 3, 4 layers transmissions, corresponding to the previous codeword.

TABLE 2 antenna port, scrambling code identity and layer indicator field

| Single codeword enabled Codeword 0 enabled, Codeword 1 disabled | | Two codewords enabled Codeword 0 enabled, Codeword 1 enabled | |
|---|---|---|---|
| Value | Message | Value | Message |
| 0 | 1 layer, port 7, nSCID = 0 | 0 | 2 layers, ports 7-8, nSCID = 0 |
| 1 | 1 layer, port 7, nSCID = 1 | 1 | 2 layers, ports 7-8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

For single codeword one-layer transmission, when the modulation and coding scheme indicator field corresponding to the TB is $I_{MCS}=0$, and the redundancy version indicator field rvidx=1, it indicates that the corresponding TB is not enabled. Then the other enabled codeword selects the transmission antenna port, scrambling code identity and layers according to the antenna indicator field. As shown in Table 2, when the indicator field Value=0, the Layer is 1 layer, the transmission antenna port is port 7, and the scrambling code identity is nSCID=0, when the indicator field Value=1, the layer is 1 layer, the port is port 7, and the scrambling code identity nSCID=1, when the indicator field Value=2, the layer is 1 layer, the port is port 8, and the scrambling code identity is nSCID=0, when the indicator field Value=3, the layer is 1 layer, the port is port 8, and the scrambling code identity nSCID=1.

For two codewords two-layer transmission, when the indicator field Value=0, the layers are two layers, the ports are ports 7-8, the scrambling code identity nSCID=0, when the indicator field Value=1, the layers are 2 layers, the ports are ports 7-8, the scrambling code identity nSCID=1, and so on, when the number of layers is greater than 2, the scrambling code identity indicates that nSCID=0 by default.

SUMMARY OF THE INVENTION

The embodiment of the present invention provides a method for configuring and acquiring downlink control information, a base station and a terminal.

A method for configuring downlink control information provided in an embodiment of the present invention, comprises:

when a base station configures a terminal with a plurality of sets of receiving information via a terminal specific high-layer signaling, the receiving information comprises at least one of the following information:

a demodulation reference signal (DMRS) sequence initialization flag;

bandwidth information of a DMRS;

Qusi-Co-Location information of a DMRS;

non-zero-power channel state information reference signal (NZP CSI-RS) configuration index information which is used to indicate a large-scale information correspondence between the DMRS and the NZP CSI-RS;

rate matching indication information;

when the base station configures the terminal with a downlink control information format DCI Format 1A, the base station using at least one of the following information to indicate the terminal to use which set in the plurality of sets of receiving information to perform a DMRS and/or physical downlink shared channel (PDSCH) reception:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may further have the following feature: when the base station configures the terminal to use the DCI Format 1A in a terminal-specific search space to receive the PDSCH, or the base station configures the terminal to use the DCI Format 1A to receive the PDSCH in a new carrier type subframe or in a subframe which does not have a cell-specific reference signal (CRS), the LVRB/DVRB bit is used to indicate the terminal to use which set in the abovementioned information configured by the terminal specific high-layer signaling to perform a DMRS and/or PDSCH reception.

Preferably, the abovementioned method may have the following feature: the base station uses the control channel mode where the DCI Format 1A is located: the PDCCH and the ePDCCH, to indicate the terminal to use which set in the abovementioned information configured by the terminal specific high-layer signaling to perform the DMRS and/or PDSCH reception, comprising:

when the base station configures the terminal to use the DCI Format 1A to receive the PDSCH in the terminal specific search space, or the base station configures the terminal to use the DCI Format 1A to receive the PDSCH in a new carrier type subframe or a subframe which does not have the CRS, using the control channel mode where the DCI Format 1A is located to indicate the terminal to use which set in the abovementioned information configured by the terminal specific high-layer signaling to perform the DMRS and/or PDSCH reception; or, when the base station configures the terminal to use the DCI Format 1A to receive the PDSCH, using the control channel mode where the DCI Format 1A is located to indicate the terminal to use which set in the abovementioned information configured by the terminal specific high-layer signaling to perform the DMRS and/or PDSCH reception.

Preferably, the abovementioned method may have the following feature: when the base station configures the terminal to receive the DCI Format 1A on the PDCCH, it is equivalent to indicating the terminal to use related information of an access serving cell or using the first set in the abovementioned information configured by the terminal specific high-layer signaling to perform the DMRS and/or PDSCH reception; and/or, when the base station configures the terminal to receive the DCI Format 1A on the ePDCCH, it is equivalent to indicating the terminal to use one set in the abovementioned information configured by the terminal specific high layer signaling to perform the DMRS and/or PDSCH reception.

Preferably, the abovementioned method may further have the following feature: the base station uses the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception, comprising:

when the base station configures the terminal to use the DCI Format 1A to receive the PDSCH in the terminal specific search space, or, the base station configures the terminal to use the DCI Format 1A to receive the PDSCH in a new carrier type subframe or in a subframe which does not have the CRS, using the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception; or, when the base station configures the terminal to use the DCI Format 1A to receive the PDSCH, using the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception.

The abovementioned method may have the following feature: when the base station configures the terminal to receive the DCI Format 1A on the PDCCH, it is equivalent to indicating the terminal to use the related information of the access serving cell to perform the DMRS and/or PDSCH reception; or, using the first set in the abovementioned information configured by the terminal specific high-layer signaling to perform the DMRS and/or PDSCH reception; or, using the one, which is indicated by the LVRB/DVRB bit in the DCI Format 1A, in the two sets of the abovementioned information configured by the terminal specific high-layer signaling to perform the DMRS and/or PDSCH reception; and/or, when the base station configures the terminal to receive the DCI Format 1A on the ePDCCH, it is equivalent to indicating the terminal to use the one, which is indicated by the LVRB/DVRB bit in the DCI Format 1A, in the two sets of the abovementioned information configured by the terminal specific high-layer signaling to perform the DMRS and/or PDSCH reception.

Preferably, the abovementioned method may further have the following feature: the base station indicates the terminal to use which set of the abovementioned information configured by the terminal specific high-layer signaling to perform the DMRS and/or PDSCH reception according to the configured ePDCCH transmission mode where the DCI Format 1A is located, diversity transmission mode and localized transmission mode, comprising:

when the base station configures the ePDCCH transmission mode of the terminal as the diversity transmission mode, it is equivalent to indicating the terminal to use the first set in the abovementioned information configured by the terminal specific high-layer signaling to perform the DMRS and/or PDSCH reception;

when the base station configures the ePDCCH transmission mode of the terminal as the localized transmission mode, it is equivalent to indicating the terminal to use the second set of the abovementioned information configured by the terminal specific high-layer signaling to perform the DMRS and/or PDSCH reception.

Preferably, the abovementioned method may have the following feature: the base station uses the ePDCCH transmission mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception, comprising:

when the base station configures the ePDCCH transmission mode of the terminal as the diversity transmission mode, it is equivalent to indicating the terminal to use the first and second sets in the abovementioned information configured by the terminal specific high-layer signaling to perform the DMRS and/or PDSCH reception; and using the LVRB/DVRB bit in the DCI Format 1A to indicate the terminal to use which set in the first and second sets to perform the DMRS and/or PDSCH reception;

when the base station configures the ePDCCH transmission mode of the terminal as the localized transmission mode, it is equivalent to indicating the terminal to use third and fourth sets in the abovementioned information configured by the terminal specific high-layer signaling to perform the DMRS and/or PDSCH reception; and using the LVRB/DVRB bit in the DCI Format 1A to indicate the terminal to use which set in the third and fourth sets to perform the DMRS and/or PDSCH reception.

Preferably, the abovementioned method may further have the following feature: the base station indicates the terminal to use which set in the abovementioned information configured by the terminal specific high-layer signaling to perform the DMRS and/or PDSCH reception according to the configured ePDCCH cluster where the DCI Format 1A is located, comprising:

when the base station configures the ePDCCH of the terminal to be transmitted in the first cluster of the ePDCCH, it is equivalent to indicating the terminal to use the first set in the abovementioned information configured by the terminal specific high-layer signaling to perform the DMRS and/or PDSCH reception;

when the base station configures the ePDCCH of the terminal to be transmitted in the second cluster of the ePDCCH, it is equivalent to indicating the terminal to use the second set in the abovementioned information configured by the terminal specific high-layer signaling to perform the DMRS and/or PDSCH reception.

Preferably, the abovementioned method may have the following feature: the first and second sets in the abovementioned information are specifically configured for the DCI Format 1A, or two sets in four states configured for the DCI Format 2D, or two sets of the abovementioned information configured for the ePDCCH of terminal by the base station through the terminal specific high-layer signaling, and the two sets of the abovementioned information of the ePDCCH are independently configured for two eDPCCH clusters.

Preferably, the abovementioned method may have the following feature: the base station indicates the terminal to use which set in the abovementioned information configured by the terminal specific high-layer signaling to perform the DMRS and/or PDSCH reception by configuring the ePDCCH cluster where the DCI Format 1A is located and the LVRB/DVRB bit in the DCI Format 1A, comprising:

when the base station configures the ePDCCH of the terminal to be transmitted in a first cluster of the ePDCCH, it being equivalent to indicating the terminal to use the first and second sets in the abovementioned information configured by the terminal specific high-layer signaling to perform the DMRS and/or PDSCH reception; and indicating the terminal to use which set in the first and second sets to perform the DMRS and/or PDSCH reception by using the DCI Format 1A LVRB/DVRB bit;

when the base station configures the ePDCCH of the terminal to be transmitted in a second cluster of the ePDCCH, it being equivalent to indicating the terminal to use the third and fourth sets in the abovementioned information configured by the terminal specific high-layer signaling to perform the DMRS and/or PDSCH reception; and indicating the terminal using which set in the third and fourth sets to perform the DMRS and/or PDSCH reception by using the DCI Format 1A LVRB/DVRB bit.

Preferably, the abovementioned method may have the following feature: the first and second sets in the abovementioned information are configured by using a first high-layer signaling, the third and fourth sets are configured by using a second high-layer signaling, and the first high-layer signaling and the second high-layer signaling are configured by using a uniform high-layer signaling or independent high-layer signaling.

Preferably, the abovementioned method may further have the following feature: the large-scale information comprises one or more of the following information: delay spread, each path delay, Doppler frequency shift, frequency shift, Doppler spread and average receive power.

Preferably, the abovementioned method may further have the following feature: the rate matching indication information comprises one or a combination of the following information:

location information of a resource element on which rate matching or interference cancellation needs to be performed, start position of an orthogonal frequency division multiplexing (OFDM) symbol of the PDSCH, configuration condition of a multicast broadcast single frequency network (MBSFN) subframe corresponding to a resource location, the number of CRS ports, location information of CRS frequency-domain resource, cell identity, information of zero power CSI-RS configuration.

Preferably, the abovementioned method may further have the following feature: the DMRS sequence initialization flag is used to calculate an initial value $c_{init}$ for generating a downlink DMRS sequence.

Preferably, the abovementioned method may further have the following feature: the method further comprises: when the base station does not configure one of the following information for the terminal through the terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal (NZP CSI-RS) configuration indexes to indicate a large-scale information correspondence between the DMRS and the NZP CSI-RS;

a plurality of sets of rate matching indication information;

when implicitly indicating the terminal to use the DCI Format 1A to receive the PDSCH in the terminal-specific search space or using the DCI Format 1A to receive the PDSCH in a new carrier type subframe or a subframe which does not have the CRS, the DMRS and/or PDSCH reception is performed according to the identity, bandwidth information, large-scale information and rate matching information of an access serving cell during the synchronization.

The embodiment of the present invention further provides a method for indicating antenna ports, comprising:

when a base station configures a downlink control information format DCI Format 1A for a terminal, using at least one of the following information to indicate the terminal to use a CRS port or a DMRS port to perform the DMRS and/or PDSCH reception:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, when the base station configures the terminal to use the DCI Format 1A to receive the PDSCH in the terminal specific search space or configures the terminal to use the DCI Format 1A to receive the PDSCH in a new carrier type subframe or a subframe which does not have the CRS, at least one of the following information is used to indicate the terminal using the CRS port or the DMRS port to perform the DMRS and/or PDSCH reception:

the localized/distributed virtual resource block assignment (LVRB/DVRB) bit in the DCI Format 1A;

the control channel mode, where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a method for indicating antenna ports, comprising:

when configuring a downlink control information format DCI Format 1A for a terminal, a base station using at least one of the following information to indicate the terminal to use which DMRS antenna port or DMRS antenna port group to perform the DMRS and/or PDSCH reception:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may further have the following feature: when the base station configures the terminal to use the DCI Format 1A to receive the PDSCH in a terminal-specific search space or configuring the terminal to use the DCI Format 1A to receive the PDSCH in a new carrier type subframe or a subframe which does not have the CRS, using at least one of the following information to indicate the terminal to use which DMRS antenna port or DMRS antenna port group to perform the DMRS reception and/or PDSCH reception:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a method for indicating the number of transmission layers, comprising:

when a base station configures a downlink control information format DCI Format 1A for a terminal, the base station using at least one of the following information to indicate the number of DMRS transmission layers of the terminal:

a localized/distributed virtual resource blockassignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may further have the following feature: when the base station configures the terminal to use the DCI Format 1A to receive the PDSCH in a terminal-specific search space or configures the terminal to use the DCI Format 1A to receive the PDSCH in a new carrier type subframe or in a subframe which does not have a CRS, the base station uses at least one of the following information to indicate the number of DMRS transmission layers of the terminal:

the localized/distributed virtual resource block assignment (LVRB/DVRB) bit in the DCI Format 1A;

the control channel mode where the DCI Format 1A is located: PDCCH and ePDCCH;

the ePDCCH transmission mode, where the DCI Format 1A is located: diversity transmission mode and localized transmission mode;

the ePDCCH cluster where the DCI Format 1A is located.

The embodiment of the present invention further provides a method for acquiring downlink control information, comprising: when a terminal obtains a plurality of sets of receiving information configured by a base station through a terminal specific high-layer signaling, the receiving information at least comprises one of the following information:

a demodulation reference signal (DMRS) sequence initialization flag;

bandwidth information of a DMRS;

Qusi-Co-Location information of a DMRS;

information of a non-zero power channel state information reference signal (NZP CSI-RS) configuration index to indicate a large-scale information correspondence between the DMRS and the NZP CSI-RS;

rate matching indication information;

the terminal acquires the downlink control information format DCI Format 1A, and determines to use which set in the plurality of sets of receiving information to perform a DMRS and/or PDSCH reception according to at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may have the following feature: when using the DCI Format 1A to receive the PDSCH in the terminal-specific search space or uses the DCI Format 1A to receive the PDSCH in a new carrier type subframe or a sub-frame which does not have the CRS, the terminal determines to use which set in the abovementioned information configured by the terminal specific high-layer signaling to perform the DMRS and/or PDSCH reception according to the localized/distributed virtual resource block assignment (LVRB/DVRB) bit in the DCI Format 1A.

Preferably, the abovementioned method may further have the following feature: when using the DCI Format 1A to receive the PDSCH in the terminal-specific search space, or, the terminal uses the DCI Format 1A to receive the PDSCH in a new carrier type subframe or a subframe which does not have the CRS, the terminal determines to uses which set in the abovementioned information configured by the terminal specific high-layer signaling to perform the DMRS and/or PDSCH reception according to the control channel mode where the DCI Format 1A is located; or, when using the DCI Format 1A to receive the PDSCH, the terminal determines that the terminal uses which set in the abovementioned information configured by the terminal specific high-layer signaling to perform the DMRS and/or PDSCH reception according to the control channel mode where the DCI Format 1A is located.

Preferably, the abovementioned method may further have the following feature: when the terminal receives the DCI Format 1A on the PDCCH, related information of an access serving cell or the first set in the abovementioned information configured by the terminal special high-layer signaling is used to perform the DMRS and/or PDSCH reception; and/or, when the terminal receives the DCI Format 1A on the ePDCCH, the terminal uses one set in the abovementioned information configured by the terminal specific high-layer signaling to perform the DMRS and/or PDSCH reception.

Preferably, the abovementioned method may further have the following feature: the terminal determines the terminal to use which set in the abovementioned information configured by the terminal specific high-layer signaling to perform the DMRS and/or PDSCH reception according to the control channel mode where the DCI Format 1A is located and the LVRB/DVRB bit in the DCI Format 1A, comprising:

when using the DCI Format 1A to receive the PDSCH in the terminal specific search space, or, using the DCI Format 1A to receive the PDSCH in a new carrier type subframe or a subframe which does not have the CRS, according to the control channel mode where the DCI Format 1A is located and the LVRB/DVRB bits in the DCI Format 1A, the terminal determining the terminal to use which set in the abovementioned information configured by the terminal specific high-layer signaling to perform the DMRS and/or PDSCH reception; or, when the terminal uses the DCI Format 1A to receive the PDSCH, using the control channel mode where the DCI Format 1A is located and the LVRB/DVRB bit in the DCI Format 1A to determine the terminal to use which set in the abovementioned information configured by the terminal specific high-layer signaling to perform the DMRS and/or PDSCH reception.

Preferably, the abovementioned method may further have the following feature: when the terminal receives the DCI Format 1A on the PDCCH, the terminal uses the related information of the access serving cell or the first set in the abovementioned information configured by the terminal specific high-layer signaling to perform the DMRS and/or PDSCH reception; or, uses the one, which is indicated by the LVRB/DVRB bit in the DCI Format 1A, in the two sets of the abovementioned information configured by the terminal specific high-layer signaling to perform the DMRS and/or PDSCH reception; and/or, when the terminal receives the DCI Format 1A on the ePDCCH, using the one, which is indicated by the LVRB/DVRB bit in the DCI Format 1A, in the two sets of the abovementioned information configured by the terminal specific high-layer signaling to perform the DMRS and/or PDSCH reception.

Preferably, the abovementioned method may further have the following feature: the terminal determines the terminal to use which set in the abovementioned information configured by the terminal special high-layer signaling to perform the DMRS and/or PDSCH reception according to the configured ePDCCH transmission mode where the DCI Format 1A is located: diversity transmission mode and localized transmission mode, comprising:

when the ePDCCH transmission mode configured for the terminal is the diversity transmission mode, the terminal using the first set in the abovementioned information configured by the terminal specific high-layer signaling to perform the DMRS and/or PDSCH reception;

when the ePDCCH transmission mode configured for the terminal is the localized transmission mode, the terminal using the second set in the abovementioned information configured by the terminal specific high-layer signaling to perform the DMRS and/or PDSCH reception.

Preferably, the abovementioned method may further have the following feature: the terminal determines the terminal using which set in the abovementioned information configured by the terminal specific high-layer signaling to perform the DMRS and/or PDSCH reception according to the configured ePDCCH transmission mode where the DCI Format 1A is located and the LVRB/DVRB bit in the DCI Format 1A, comprising:

when the ePDCCH transmission mode is the diversity transmission mode, the terminal using the first and second sets in the abovementioned information configured by the terminal specific high-layer signaling to perform the DMRS and/or PDSCH reception; and using the LVRB/DVRB bit in the DCI Format 1A to indicate to use which set in the first and second sets to perform the DMRS and/or PDSCH reception;

when the ePDCCH transmission mode of the terminal is the localized transmission mode, the terminal using the third and fourth sets in the abovementioned information configured by the terminal specific high-layer signaling to perform the DMRS and/or PDSCH reception; and using the LVRB/DVRB bit in the DCI Format 1A to determine to use which set in the third and fourth sets to perform the DMRS and/or PDSCH reception.

Preferably, the abovementioned method may further have the following feature: the terminal determines using which set in the abovementioned information configured by the terminal special high-layer signaling to perform the DMRS and/or PDSCH reception according to the configured ePDCCH cluster where the DCI Format 1A is located, comprising:

when the terminal detects that the ePDCCH is transmitted in the first cluster of the ePDCCH, the terminal using the first set in the abovementioned information configured by the terminal specific high-layer signaling to perform the DMRS and/or PDSCH reception;

when the terminal detects that the ePDCCH is transmitted in the second cluster of the ePDCCH, the terminal using the second set in the abovementioned information configured by the terminal specific high-layer signaling to perform the DMRS and/or PDSCH reception.

Preferably, the abovementioned method may further have the following feature: the terminal determines using which set in the abovementioned information configured by the terminal specific high-layer signaling to perform the DMRS and/or PDSCH reception according to the configured ePDCCH cluster where the DCI Format 1A is located and the LVRB/DVRB bit in the DCI Format 1A, comprising:

when the terminal detects that the ePDCCH is transmitted in the first cluster of the ePDCCH, the terminal using the first and second sets in the abovementioned information configured by the terminal specific high-layer signaling to perform the DMRS and/or PDSCH reception; and using the DCI Format 1A LVRB/DVRB bit to determine using which set in the first and second sets to perform the DMRS and/or PDSCH reception;

when the terminal detects that the ePDCCH is transmitted in the second cluster of the ePDCCH, the terminal using the third and fourth sets in the abovementioned information configured by the terminal specific high-layer signaling to perform the DMRS and/or PDSCH reception; and using the DCI Format 1A LVRB/DVRB bit to determine using which set in the third and fourth sets to perform the DMRS and/or PDSCH reception.

Preferably, the abovementioned method may further have the following feature: when the terminal does not acquire one of the following information through the terminal specific high-layer signaling:

a plurality of demodulation reference signal DMRS sequence initialization flags;

bandwidth information of a plurality of DMRSs;

Qusi-Co-Location information of a plurality of DMRSs;

information of a plurality of non-zero power channel state information reference signal (NZP) CSI-RS configuration indexes to indicate a large-scale correspondence between the DMRS and the NZP CSI-RS;

a plurality of sets of rate matching indication information;

when the terminal uses the DCI Format 1A to receive the PDSCH in the terminal-specific search space or uses the DCI Format 1A to receive the PDSCH in the new carrier type subframe or a subframe which does not have the CRS, the DMRS and/or PDSCH reception is performed in accordance with the identity, bandwidth information, large-scale information and rate matching information of the access serving cell during the synchronization.

The embodiment of the present invention further provides a method for determining antenna ports, comprising:

the terminal receiving a downlink control information format DCI Format 1A configured by a base station, and determining to use a CRS port or a DMRS port to perform the DMRS and/or PDSCH reception according to at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may further have the following feature, when the terminal uses the DCI Format 1A to receive the PDSCH in a terminal-specific search space or uses the DCI Format 1A to receive the PDSCH in a new carrier type subframe or a subframe which does not have the CRS:

the terminal determines to use a CRS port or a DMRS port to perform the DMRS and/or PDSCH reception according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a method for determining antenna ports, comprising:

a terminal receiving a downlink control information format DCI Format 1A configured by a base station, and determining to user which DMRS antenna port or DMRS antenna port group to perform the DMRS and/or PDSCH reception according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

Preferably, the abovementioned method may further have the following feature: when the terminal uses the DCI Format 1A to receive the PDSCH in the terminal specific search space or the terminal uses the DCI Format 1A to receive the PDSCH in a new carrier type subframe or a subframe which does not have the CRS, at least one of the following information is used to determine using which DMRS antenna port or DMRS antenna port group to perform the DMRS and/or PDSCH reception:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a method for determining the number of transmission layers, comprising:

a terminal receiving a downlink control information format DCI Format 1A configured by a base station, and using at least one of the following information to determine the number of DMRS transmission layers of the terminal:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned method may further have the following feature: when the terminal uses the DCI Format 1A to receive the PDSCH in a terminal specific search space or configures the terminal to use the DCI Format 1A to receive the PDSCH in a new carrier type subframe or in a subframe which does not have the CRS, the number of DMRS transmission layers of the terminal is determined according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a base station, comprising:

a configuration unit, configured to configure a terminal with a plurality of sets of at least one of the following information through a terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal NZP CSI-RS configuration index to indicate a large-scale information correspondence between the DMRS and the NZP CSI-RS;

a plurality of sets of rate matching indication information;

an indication unit, configured to use at least one of the following information to indicate the terminal to use which set in the abovementioned information configured by the terminal specific high-layer signaling to perform a DMRS and/or PDSCH reception when configuring the terminal with the downlink control information format DCI Format 1A:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

Preferably, the abovementioned base station may further have the following feature: the indication unit is configured to: when the base station configures the terminal to use the DCI Format 1A to receive the PDSCH in the terminal-specific search space, or the base station configures the terminal to use the DCI Format 1A to receive the PDSCH in a new carrier type subframe or a sub-frame which does not have the CRS, use the LVRB/DVRB bit to indicate the terminal using which set in the abovementioned information configured by the terminal specific high-layer signaling to perform the DMRS and/or PDSCH reception.

Preferably, the abovementioned base station may further have the following feature: the indication unit uses the control channel mode where the DCI Format 1A is located: PDCCH and ePDCCH, to indicate the terminal to use which set in the abovementioned information configured by the terminal specific high-layer signaling to perform the DMRS and/or PDSCH reception, comprising:

when the base station configures the terminal to use the DCI Format 1A to receive the PDSCH in the terminal specific search space, or the base station configures the terminal to use the DCI Format 1A to receive the PDSCH in a new carrier type subframe or a subframe which does not have the CRS, using the control channel information where the DCI Format 1A is located to indicate the terminal to use which set in the abovementioned information configured by the terminal specific high-layer signaling to perform the DMRS and/or PDSCH reception; or, when the base station configures the terminal to use the DCI Format 1A to receive the PDSCH, using the control channel mode where the DCI Format 1A is located to indicate the terminal to use which set in the abovementioned information configured by the terminal specific high-layer signaling to perform the DMRS and/or PDSCH reception.

Preferably, the abovementioned base station may further have the following feature: the indication unit is configured to:

when configuring the terminal to receive the DCI Format 1A on the PDCCH, it is equivalent to indicating the terminal to use related information of an access serving cell or using the first set in the abovementioned information configured by the terminal specific high-layer signaling to perform the DMRS and/or PDSCH reception; and/or, when configuring the terminal to receive the DCI Format 1A on the ePDCCH, it is equivalent to indicating the terminal to use one set in the abovementioned information configured by the terminal specific high-layer signaling to perform the DMRS and/or PDSCH reception.

The abovementioned base station may further have the following feature: the indication unit uses the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception, comprising:

when the base station configures the terminal to use the DCI Format 1A to receive the PDSCH in the terminal specific search space, or, the base station configures the terminal to use the DCI Format 1A to receive the PDSCH in a new carrier type subframe or in a subframe which does not have the CRS, using the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception; or, when the base station configures the terminal to use the DCI Format 1A to receive the PDSCH, using the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception.

Preferably, the abovementioned base station may further have the following feature: the indication unit is configured to: when configuring the terminal to receive the DCI Format 1A on the PDCCH, it is equivalent to indicating the terminal to use related information of an access serving cell to perform the DMRS and/or PDSCH reception; or, using the first set in the abovementioned information configured by the terminal specific high layer signaling to perform the DMRS and/or PDSCH reception; or, using the one, which is indicated by the LVRB/DVRB bit in the DCI Format 1A, in the two sets of the abovementioned information configured by the terminal specific high-layer signaling to perform the DMRS and/or PDSCH reception; and/or, when configuring the terminal to receive the DCI Format 1A on the ePDCCH, it is equivalent to indicating the terminal to use the one, which is indicated by the LVRB/DVRB bit in the DCI Format 1A, in the two sets of the abovementioned information configured by the terminal specific high-layer signaling to perform the DMRS and/or PDSCH reception.

Preferably, the abovementioned base station may further have the following feature: the indication unit indicates the terminal to use which set in the abovementioned information configured by the terminal specific high-layer signaling to perform the DMRS and/or PDSCH reception according to the configured ePDCCH transmission mode where the DCI Format 1A is located, diversity transmission mode and localized transmission mode, comprising:

when configuring the ePDCCH transmission mode of the terminal as the diversity transmission mode, it is equivalent to indicating the terminal to use the first set in the abovementioned information configured by the terminal specific high-layer signaling to perform the DMRS and/or PDSCH reception;

when configuring the ePDCCH transmission mode of the terminal as the localized transmission mode, it is equivalent to indicating the terminal to use the second set in the abovementioned information configured by the terminal specific high-layer signaling to perform the DMRS and/or PDSCH reception.

Preferably, the abovementioned base station may further have the following feature: the indication unit uses the configured ePDCCH transmission mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception, comprising:

when configuring the ePDCCH transmission mode of the terminal as the diversity transmission mode, it is equivalent to indicating the terminal to use the first and second sets in the abovementioned information configured by the terminal specific high-layer signaling to perform the DMRS and/or PDSCH reception; and using the LVRB/DVRB bit in the DCI Format 1A to indicate the terminal to use which set in the first and second sets to perform the DMRS and/or PDSCH reception;

when configuring the ePDCCH transmission mode of the terminal as the localized transmission mode, it is equivalent to indicating the terminal to use the third and fourth sets in the abovementioned information configured by the terminal specific high-layer signaling to perform the DMRS and/or PDSCH reception; and using the LVRB/DVRB bit in the DCI Format 1A to indicate the terminal to use which set in the third and fourth sets to perform the DMRS and/or PDSCH reception.

Preferably, the abovementioned base station may further have the following feature: the indication unit indicates the terminal to use which set in the abovementioned information configured by the terminal specific high-layer signaling to perform the DMRS and/or PDSCH reception according to the configured ePDCCH cluster where the DCI Format 1A is located, comprising:

when configuring the ePDCCH of the terminal to be transmitted in the first cluster of the ePDCCH, it is equivalent to indicating the terminal to use the first set in the abovementioned information configured by the terminal specific high-layer signaling to perform the DMRS and/or PDSCH reception;

when configuring the ePDCCH of the terminal to be transmitted in the second cluster of the ePDCCH, it is equivalent to indicating the terminal to use the second set in the abovementioned information configured by the terminal specific high-layer signaling to perform the DMRS and/or PDSCH reception.

Preferably, the abovementioned base station may further have the following feature: the configuration unit is further configured to: specifically configure the DCI Format 1A with the first and second sets of the abovementioned information through the terminal specific high-layer signaling, or configure the DCI Format 2D with four states, and two therein work as the first and second sets of the abovementioned information, or configure the ePDCCH of terminal with two sets of the abovementioned information, and the two sets of the abovementioned information of the ePDCCH are independently configured for two eDPCCH clusters.

Preferably, the abovementioned base station may further have the following feature: the indication unit indicates the terminal to use which set in the abovementioned information configured by the terminal specific high-layer signaling to perform the DMRS and/or PDSCH reception according to the configured ePDCCH cluster where the DCI Format 1A is located and the LVRB/DVRB bit in the DCI Format 1A, comprising:

when configuring the ePDCCH of the terminal to be transmitted in the first cluster of the ePDCCH, it is equivalent to indicating the terminal to use the first and second sets in the abovementioned information configured by the terminal specific high-layer signaling to perform the DMRS and/or PDSCH reception; and indicating the terminal to use which set in the first and second sets to perform the DMRS and/or PDSCH reception by using the DCI Format 1A LVRB/DVRB bit;

when configuring the ePDCCH of the terminal to be transmitted in the second cluster of the ePDCCH, it is equivalent to indicating the terminal to use the third and fourth sets in the abovementioned information configured by the terminal specific high-layer signaling to perform the DMRS and/or PDSCH reception; and indicating the terminal to use which set in the third and fourth sets to perform the DMRS and/or PDSCH reception by using the DCI Format 1A LVRB/DVRB bit.

Preferably, the abovementioned base station may further have the following feature: the configuration unit uses a first high-layer signaling to configure the first and second sets in the abovementioned information, uses a second high-layer signaling to configure the third and fourth sets, and use a uniform high-layer signaling or independent high-layer signaling to configure the first high-layer signaling and the second high-layer signaling.

19

Preferably, the abovementioned base station may have the following feature: the DMRS sequence initialization flag configured by the configuration unit is used to calculate an initial value $c_{init}$ for generating the downlink DMRS sequence.

The embodiment of the present invention further provides a base station, comprising:

a configuration unit, configured to use at least one of the following information to indicate the terminal to use a CRS port or a DMRS port to perform the DMRS and/or PDSCH reception when configuring the terminal with a downlink control information format DCI Format 1A:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the base station may further have the following feature: the configuration unit is configured to: when configuring the terminal to use the DCI Format 1A to receive the PDSCH in the terminal-specific search space or configuring the terminal to use the DCI Format 1A to receive the PDSCH in a new carrier type subframe or a subframe which does not have the CRS, use at least one of the following information to indicate the terminal to use a CRS port or a DMRS port to perform the DMRS and/or PDSCH reception:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a base station, comprising:

a configuration unit, configured to use at least one of the following information to indicate a terminal using which DMRS antenna port or DMRS antenna port group to perform a DMRS and/or PDSCH reception when configuring the terminal with a downlink control information format DCI Format 1A:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the base station may further have the following feature: the configuration unit is configured to:

when configuring the terminal to use the DCI Format 1A to receive the PDSCH in a terminal-specific search space or configuring the terminal to use the DCI Format 1A to receive the PDSCH in a new carrier type subframe or a subframe which does not have the CRS, use at least one of the following information to indicate the terminal using which DMRS antenna port or DMRS antenna port group to perform the DMRS and/or PDSCH reception:

the localized/distributed virtual resource block assignment (LVRB/DVRB) bit in the DCI Format 1A;

the control channel mode where the DCI Format 1A is located: PDCCH and ePDCCH;

20 the ePDCCH transmission mode where the DCI Format 1A is located: diversity transmission mode and localized transmission mode;

the ePDCCH cluster where the DCI Format 1A is located.

The embodiment of the present invention further provides a base station, comprising:

a configuration unit, configured to use at least one of the following information to indicate the number of DMRS transmission layers of a terminal when configuring the terminal with a downlink control information format DCI Format 1A:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

The abovementioned base station may further have the following feature: the configuration unit is configured to:

when configuring the terminal to use the DCI Format 1A to receive the PDSCH in a terminal-specific search space or configuring the terminal to use the DCI Format 1A to receive the PDSCH in a new carrier type subframe or a subframe which does not have the CRS, use at least one of the following information to indicate the number of DMRS transmission layers of the terminal:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a terminal, comprising:

a configuration information acquisition unit, configured to acquire a plurality of sets of at least one of the following information configured by the base station through the terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal NZP CSI-RS configuration indexes to indicate a large-scale information correspondence between the DMRS and the NZP CSI-RS;

a plurality of sets of rate matching indication information; and acquire the downlink control information format DCI Format 1A;

a determining unit, configured to determine to use which set in the abovementioned information configured by the terminal specific high-layer signaling to perform the DMRS and/or PDSCH reception in accordance with at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned terminal may further have the following feature: the determination unit is configured to: when the terminal uses the DCI Format 1A to receive the PDSCH in a terminal specific search space or uses the DCI Format 1A to receive the PDSCH in a new carrier type subframe or a subframe which does not have the CRS, determine to use which set in the abovementioned information configured by the terminal specific high-layer signaling to perform the DMRS and/or PDSCH reception according to the LVRB/DVRB bit in the DCI Format 1A.

Preferably, the abovementioned terminal may further have the following feature: the determination unit is configured to:

when the terminal uses the DCI Format 1A to receive the PDSCH in the terminal specific search space, or, when the terminal uses the DCI Format 1A to receive the PDSCH in the new carrier type subframe or a subframe which does not have the CRS, determine the terminal to use which set in the abovementioned information configured by the terminal specific high-layer signaling to perform the DMRS and/or PDSCH reception according to the control channel mode where the DCI Format 1A is located; or, when the terminal uses the DCI Format 1A to receive the PDSCH, determine the terminal to use which set in the abovementioned information configured by the terminal specific high-layer signaling to perform the DMRS and/or PDSCH reception according to the control channel mode where the DCI Format 1A is located.

Preferably, the abovementioned terminal may further have the following feature: the determination unit is configured to: when the terminal receives the DCI Format 1A on the PDCCH, determine to use related information of the access serving cell or use the first set in the abovementioned information configured by the terminal specific high-layer signaling to perform the DMRS and/or PDSCH reception; and/or, when the terminal receives the DCI Format 1A on the ePDCCH, determine to use one set in the abovementioned information configured by the terminal specific high-layer signaling to perform the DMRS and/or PDSCH reception.

Preferably, the abovementioned terminal may further have the following feature: the determining unit uses the control channel mode where the DCI Format 1A is located and the LVRB/DVRB bit in the DCI Format 1A to determine the terminal to use which set in the abovementioned information configured by the terminal specific high-layer signaling to perform the DMRS and/or PDSCH reception, comprising:

when the terminal uses the DCI Format 1A to receive the PDSCH in the terminal specific search space, or, the terminal uses the DCI Format 1A to receive the PDSCH in a new carrier type subframe or in a subframe which does not have the CRS, using the control channel mode where the DCI Format 1A is located and the LVRB/DVRB bit in the DCI Format 1A to indicate the terminal to use which set in the abovementioned information configured by the terminal specific high-layer signaling to perform the DMRS and/or PDSCH reception; or, when the terminal uses the DCI Format 1A to receive the PDSCH, using the control channel mode where the DCI Format 1A is located and the LVRB/DVRB bit in the DCI Format 1A to determine the terminal to use which set in the abovementioned information configured by the terminal specific high-layer signaling to perform the DMRS and/or PDSCH reception.

Preferably, the abovementioned terminal may further have the following feature: the determination unit is configured to:

when the terminal receives the DCI Format 1A on the PDCCH, determine the terminal to use the related information of the access serving cell to perform the DMRS and/or PDSCH reception; or, using the first set in the abovementioned information configured by the terminal specific high layer signaling to perform the DMRS and/or PDSCH reception; or, determine to use the one, indicated by the LVRB/DVRB bit in the DCI Format 1A, in the two sets of the abovementioned information configured by the terminal specific high-layer signaling to perform the DMRS and/or PDSCH reception; and/or, when the terminal receives the DCI Format 1A on the ePDCCH, determine to use the one, indicated by the LVRB/DVRB bit in the DCI Format 1A, in the two sets of the abovementioned information configured by the terminal specific high-layer signaling to perform the DMRS and/or PDSCH reception.

Preferably, the abovementioned terminal may further have the following feature: the determination unit determines the terminal to use which set in the abovementioned information configured by the terminal specific high-layer signaling according to the configured ePDCCH transmission mode where the DCI Format 1A is located: diversity transmission mode and localized transmission mode, to perform the DMRS and/or PDSCH reception, comprising:

when the ePDCCH transmission mode configured by the terminal is the diversity transmission mode, determining the terminal to use the first set in the abovementioned information configured by the terminal specific high-layer signaling to perform the DMRS and/or PDSCH reception;

when the ePDCCH transmission mode configured by the terminal is the localized transmission mode, determining the terminal to use the second set in the abovementioned information configured by the terminal specific high-layer signaling to perform the DMRS and/or PDSCH reception.

Preferably, the abovementioned terminal may further have the following feature: the determination unit uses the ePDCCH transmission mode where the DCI Format 1A is located and the LVRB/DVRB bit in the DCI Format 1A to determine that the terminal uses which set in the abovementioned information configured by the terminal specific high-layer signaling to perform the DMRS and/or PDSCH reception, comprising:

when the ePDCCH transmission mode is the diversity transmission mode, determining that the terminal uses the first and second sets in the abovementioned information configured by the terminal specific high-layer signaling to perform the DMRS and/or PDSCH reception; and uses the LVRB/DVRB bit in the DCI Format 1A to determine using which set in the first and second sets to perform the DMRS and/or PDSCH reception;

when the ePDCCH transmission mode is the localized transmission mode, determining that the terminal uses the third and fourth sets in the abovementioned information configured by the terminal specific high-layer signaling to perform the DMRS and/or PDSCH reception; and uses the LVRB/DVRB bit in the DCI Format 1A to determine using which set in the third and fourth sets to perform the DMRS and/or PDSCH reception.

Preferably, the abovementioned terminal may further have the following feature: the determination unit determines to use which set in the abovementioned information configured by the terminal specific high-layer signaling to perform the DMRS and/or PDSCH reception according to the configured ePDCCH cluster where the DCI Format 1A is located, comprising:

when detecting that the ePDCCH is transmitted in the first cluster of the ePDCCH, determining that the terminal uses the first set in the abovementioned information configured by the terminal specific high-layer signaling to perform the DMRS and/or PDSCH reception;

when detecting that the ePDCCH is transmitted in the second cluster of the ePDCCH, determining that the terminal uses the second set in the abovementioned information configured by the terminal specific high-layer signaling to perform the DMRS and/or PDSCH reception.

Preferably, the abovementioned terminal may further have the following feature: the first and second sets in the abovementioned information are specifically configured by the base station through the terminal specific high-layer signaling for the DCI Format 1A, or two in the four states configured for the DCI Format 2D, or two sets in the abovementioned information configured for the ePDCCH of terminal, and the two sets of the abovementioned information of the ePDCCH are independently configured for the two eDPCCH clusters.

Preferably, the abovementioned terminal may further have the following feature: the determination unit determines to use which set in the abovementioned information configured by the terminal specific high-layer signaling to perform the DMRS and/or PDSCH reception according to the configured ePDCCH cluster where the DCI Format 1A is located and the LVRB/DVRB bit in the DCI Format 1A, comprising:

when detecting that the ePDCCH is transmitted in the first cluster of the ePDCCH, determining that the terminal uses the first and second sets in the abovementioned information configured by the terminal specific high-layer signaling to perform the DMRS and/or PDSCH reception; and uses the DCI Format 1A LVRB/DVRB bit to determine using which set in the first and second sets to perform the DMRS and/or PDSCH reception;

when detecting that the ePDCCH is transmitted in the second cluster of the ePDCCH, determining that the terminal uses the third and fourth sets in the abovementioned information configured by the terminal specific high-layer signaling to perform the DMRS and/or PDSCH reception; and uses the DCI Format 1A LVRB/DVRB bit to determine using which set in the third and fourth sets to perform the DMRS and/or PDSCH reception.

Preferably, the abovementioned terminal may further have the following feature: the first and second sets in the abovementioned information are configured with a first high-layer signaling, the third and fourth sets in the abovementioned information are configured with a second high-layer signaling, and the first high-layer signaling and the second high-layer signaling are configured with a uniform high-layer signaling or independent high-layer signaling.

Preferably, the abovementioned terminal may further have the following feature: the DMRS sequence initialization flag acquired by the configuration information acquisition unit is used for calculating an initial value $c_{init}$ for generating the downlink DMRS sequence.

Preferably, the abovementioned terminal may further have the following feature: the determination unit is further configured to: when the configuration information acquisition unit does not acquire one of the following information through the terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal (NZP CSI-RS) configuration indexes to indicate a large-scale information correspondence between the DMRS and the NZP CSI-RS;

a plurality of sets of rate matching indication information;

when using the DCI Format 1A to receive the PDSCH in the terminal-specific search space or using the DCI Format 1A to receive the PDSCH in a new carrier type subframe or a subframe which does not have the CRS, the DMRS and/or PDSCH reception is performed according to the identity, bandwidth information, large-scale information and rate matching information of an access serving cell during the synchronization.

The embodiment of the present invention further provides a terminal, comprising:

a configuration information acquisition unit, configured to receive a downlink control information format DCI Format 1A configured by a base station;

a determination unit, configured to determine to use a CRS port or a DMRS port to perform the DMRS and/or PDSCH reception according to at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned terminal may further have the following feature: the determination unit is configured to:

when the terminal uses the DCI Format 1A to receive the PDSCH in a terminal-specific search space or uses the DCI Format 1A to receive the PDSCH in a new carrier type subframe or a subframe which does not have the CRS, determine to use a CRS port or a DMRS port to perform the DMRS and/or PDSCH reception according to at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

The embodiment of the present invention further provides a terminal, comprising:

a configuration information acquisition unit, configured to receive a downlink control information format DCI Format 1A configured by a base station;

a determination unit, configured to determine to use which DMRS antenna port or DMRS antenna port group to perform the DMRS and/or PDSCH reception according to at least one of the following information:

a localized/distributed virtual resource block assignment (LVRB/DVRB) bit in the DCI Format 1A;

a control channel mode where the DCI Format 1A is located: PDCCH and ePDCCH;

an ePDCCH transmission mode where the DCI Format 1A is located: diversity transmission mode and localized transmission mode;

an ePDCCH cluster where the DCI Format 1A is located.

Preferably, the abovementioned terminal may further have the following feature: the determination unit is configured to:

when the terminal uses the DCI Format 1A to receive the PDSCH in the terminal-specific search space or uses the DCI Format 1A to receive the PDSCH in a new carrier type subframe or a subframe which does not have the CRS, determine to use which DMRS antenna port or DMRS antenna port group to perform the DMRS and/or PDSCH reception according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a terminal, comprising:

a configuration information acquisition unit, configured to receive the downlink control information format DCI Format 1A configured by the base station;

a determining unit, configured to determine the number of DMRS transmission layers of the terminal according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

Preferably, the abovementioned terminal may further have the following feature: the determination unit is configured to:

when the terminal uses the DCI Format 1A to receive the PDSCH in a terminal-specific search space or uses the DCI Format 1A to receive the PDSCH in a new carrier type subframe or a subframe which does not have the CRS, determine the number of DMRS transmission layers of the terminal according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides an interference measurement method, comprising: when interference measurement resources (IMR) appear on a scheduling PDSCH subframe, and the corresponding IMR resources are not contained in an available zero power channel state information reference signal (ZP CSI-RS) configuration of a current subframe, a terminal does not perform an interference measurement on a resource block on which the IMR collides with the PDSCH.

The embodiment of the present invention further provides an interference measurement method, comprising: when interference measurement resources IMR appear on a scheduling PDSCH subframe and the corresponding IMR resources are not contained in an available ZP CSI-RS configuration of the current subframe, the terminal does not perform an interference measurement on the subframe.

The embodiment of the present invention further provides a method for configuring downlink control information, comprising:

through a terminal specific high-layer signaling, a base station independently configuring each ePDCCH cluster of the terminal with:

ePDCCH bandwidth information or bandwidth information corresponding to ePDCCH DMRS;

preferably, the abovementioned method further comprises:

the terminal receiving the DMRS bandwidth information corresponding to each ePDCCH cluster configured by the base station high-layer signaling.

With the scheme in the embodiment of the present invention, the purpose of orthogonality and quasi-orthogonality (interference randomization) of the CoMP technology can be guaranteed and the purpose of cell division can also be reached in the scenario of Scenario 4. In addition, the bandwidth notification method in the embodiment of the present invention can support data transmission and reception in the assumption of different bandwidth, different rate matching information and large-scale information, which can achieve the purposes of increasing cell division gain, reducing interference and saving energy.

PREFERRED EMBODIMENTS OF THE INVENTION

Figure 1:
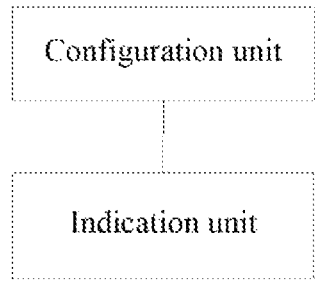
FIG. 1 is a block diagram of a base station in accordance with an embodiment of the present invention.

Hereinafter, in conjunction with the accompanying drawings, the embodiments of the present invention will be described in detail. It should be noted that, in the case of no conflicts, the embodiments of the present application and features in the embodiment can be arbitrarily combined with each other.

The LVRB/DVRB bit in the present application refers to the Localized/Distributed VRB assignment flag bit in the DCI Format 1A.

The embodiment of the present invention provides a method for configuring downlink control information, comprising:

When a a base station configures a terminal with a plurality of sets of at least one of the following information via a terminal specific high-layer signaling:

a demodulation reference signal (DMRS) sequence initialization flag;

bandwidth information of a DMRS;

Qusi-Co-Location information of a DMRS;

information of a non-zero-power channel state information reference signal (NZP CSI-RS) configuration index to indicate a large-scale information correspondence between the DMRS and the NZP CSI-RS;

rate matching indication information;

when the base station configures the terminal with the downlink control information format DCI Format 1A, the base station uses at least one of the following information:

the localized/distributed virtual resource block assignment (LVRB/DVRB) bit in the DCI Format 1A;

the channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located, to indicate the terminal to use which set in the abovementioned information configured by the terminal specific high-layer signaling to receive the DMRS and/or physical downlink shared channel (PDSCH).

Wherein, when the base station configures the terminal to use the DCI Format 1A in the terminal-specific search space to receive the PDSCH, or the base station configures the terminal to use the DCI Format 1A to receive the PDSCH in a new carrier type subframe or in a subframe which does not have the cell-specific reference signal (CRS), the LVRB/DVRB bit is used to indicate the terminal to use which set in the abovementioned information configured by the terminal specific high-layer signaling to perform the DMRS and/or PDSCH reception.

Wherein, the base station uses the control channel mode where the DCI Format 1A is located: the PDCCH and the ePDCCH, to indicate the terminal to use which set in the abovementioned information configured by the terminal specific high-layer signaling to perform the DMRS and/or PDSCH reception, comprising:

when the base station configures the terminal to use the DCI Format 1A to receive the PDSCH in the terminal specific search space, or the base station configures the terminal to use the DCI Format 1A to receive the PDSCH in a new carrier type subframe or a subframe which does not have the CRS, the control channel information where the DCI Format 1A is located is used to indicate the terminal to use which set in the abovementioned information configured by the terminal specific high-layer signaling to perform the DMRS and/or PDSCH reception; or, when the base station configures the terminal to use the DCI Format 1A to receive the PDSCH, the control channel mode where the DCI Format 1A is located is used to indicate the terminal to use which set in the abovementioned information configured by the terminal-specific high-layer signaling to perform the DMRS and/or PDSCH reception.

Wherein, when the base station configures the terminal to receive the DCI Format 1A on the PDCCH, it is equivalent to indicating the terminal to use the related information of the access serving cell or using the first set in the abovementioned information configured by the terminal-specific high-layer signaling to perform the DMRS and/or PDSCH reception; and/or, when the base station configures the terminal to receive the DCI Format 1A on the ePDCCH, it is equivalent to indicating the terminal to use one set in the abovementioned information configured by the terminal specific high layer signaling to perform the DMRS and/or PDSCH reception.

When the base station configures the terminal to use the DCI Format 1A to receive the PDSCH in the terminal specific search space, or, the base station configures the terminal to use the DCI Format 1A to receive the PDSCH in a new carrier type subframe or in a subframe which does not have the CRS, the control channel mode where the DCI Format 1A is located and the LVRB/DVRB bit in the DCI Format 1A are used to indicate the terminal to use which set in the abovementioned information configured by the terminal specific high-layer signaling to perform the DMRS and/or PDSCH reception; or, when the base station configures the terminal to use the DCI Format 1A to receive the PDSCH, the control channel mode where the DCI Format 1A is located and the LVRB/DVRB bit in the DCI Format 1A are used to indicate the terminal to use which set in the abovementioned information configured by the terminal specific high-layer signaling to perform the DMRS and/or PDSCH reception.

When the base station configures the terminal to receive the DCI Format 1A on the PDCCH, it is equivalent to indicating the terminal to use the related information of the access serving cell to perform the DMRS and/or PDSCH reception; or, using the first set in the abovementioned information configured by the terminal specific high-layer signaling to perform the DMRS and/or PDSCH reception; or, using the one, which is indicated by the LVRB/DVRB bit in the DCI Format 1A, in the two sets of the abovementioned information configured by the terminal specific high-layer signaling to perform the DMRS and/or PDSCH reception; and/or, when the base station configures the terminal to receive the DCI Format 1A on the ePDCCH, it is equivalent to indicating the terminal using the one, which is indicated by the LVRB/DVRB bit in the DCI Format 1A, in the two sets of the abovementioned information configured by the terminal specific high-layer signaling to perform the DMRS and/or PDSCH reception.

When the base station configures the ePDCCH transmission mode of the terminal as the diversity transmission mode, it is equivalent to indicating the terminal to use the first set in the abovementioned information configured by the terminal specific high-layer signaling to perform the DMRS and/or PDSCH reception;

when the base station configures the ePDCCH transmission mode of the terminal as the localized transmission mode, it is equivalent to indicating the terminal to use the second set in the abovementioned information configured by the terminal specific high-layer signaling to perform the DMRS and/or PDSCH reception.

When the base station configures the ePDCCH transmission mode of the terminal as the diversity transmission mode, it is equivalent to indicating the terminal to use the first and second sets in the abovementioned information configured by the terminal specific high-layer signaling to perform the DMRS and/or PDSCH reception; and using the LVRB/DVRB bit in the DCI Format 1A to indicate the terminal to use which set in the first and second sets to perform the DMRS and/or PDSCH reception;

when the base station configures the ePDCCH transmission mode of the terminal as the localized transmission mode, it is equivalent to indicating the terminal to use the third and fourth sets in the abovementioned information configured by the terminal specific high-layer signaling to perform the DMRS and/or PDSCH reception; and using the LVRB/DVRB bit in the DCI Format 1A to indicate the terminal to use which set in the third and fourth sets to perform the DMRS and/or PDSCH reception.

When the base station configures the ePDCCH of the terminal to be transmitted in the first cluster of the ePDCCH, it is equivalent to indicating the terminal to use the first set in the abovementioned information configured by the terminal specific high-layer signaling to perform the DMRS and/or PDSCH reception;

when the base station configures the ePDCCH of the terminal to be transmitted in the second cluster of the ePDCCH, it is equivalent to indicating the terminal to use the second set in the abovementioned information configured by the terminal specific high-layer signaling to perform the DMRS and/or PDSCH reception;

wherein, the first and second sets in the abovementioned information are specifically configured by the base station through the terminal specific high-layer signaling for the DCI Format 1A, or two of the four states configured for the DCI Format 2D, or two sets of the abovementioned information configured for the ePDCCH of terminal, the two sets of the abovementioned information of the ePDCCH are independently configured for two eDPCCH clusters.

When the base station configures the ePDCCH of terminal to be transmitted in the first cluster of the ePDCCH, it is equivalent to indicating the terminal to use the first and second sets in the abovementioned information configured by the terminal specific high-layer signaling to perform the DMRS and/or PDSCH reception; and using the DCI Format 1A LVRB/DVRB bit to indicate the terminal to use which set in the first and second sets to perform the DMRS and/or PDSCH reception;

when the base station configures the ePDCCH of terminal to be transmitted in the second cluster of the ePDCCH, it is equivalent to indicating the terminal to use the third and fourth sets in the abovementioned information configured by the terminal specific high-layer signaling to perform the DMRS and/or PDSCH reception; and using the DCI Format 1A LVRB/DVRB bit to indicate the terminal to use which set in the third and fourth sets to perform the DMRS and/or PDSCH reception.

The first and second sets in the abovementioned information are configured with the first high-layer signaling, the third and fourth sets are configured with the second high-layer signaling, and the first high-layer signaling and the second high-layer signaling are configured by using a uniform high-layer signaling or independent high-layer signaling.

The large-scale information comprises one or more of the following information: delay spread, each path delay, Doppler frequency shift, frequency shift, Doppler spread and average reception power.

The rate matching indication information comprises one or a combination of the following information:

location information of a resource element on which rate matching or interference cancellation needs to be performed, start position of an orthogonal frequency division multiplexing (OFDM) symbol of the PDSCH, configuration condition of a multicast broadcast single frequency network (MBSFN) subframe corresponding to a resource location, the number of CRS ports, location information of CRS frequency-domain resource, cell identity, information of zero power CSI-RS configuration.

The DMRS sequence initialization flag is used to calculate the initial value $c_{init}$ for generating a downlink DMRS sequence.

The method further comprises: when the base station does not configure the terminal with one of the following information through the terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal NZP CSI-RS configuration indexes to indicate the large-scale correspondence information between the DMRS and the NZP CSI-RS;

a plurality of sets of rate matching indication information;

when implicitly indicating the terminal to use the DCI Format 1A to receive the PDSCH in a terminal-specific search space or using the DCI Format 1A to receive the PDSCH in a new carrier type subframe or a subframe which does not have the CRS, the DMRS and/or PDSCH reception is performed according to the identity, bandwidth information, large-scale information and rate matching information of the access serving cell during the synchronization.

The embodiment of the present invention further provides a method for indicating antenna ports, comprising:

when the base station configures the downlink control information format DCI Format 1A for the terminal, at least one of the specific information is used to indicate the terminal using a CRS port or a DMRS port to perform the DMRS and/or PDSCH reception.

When the base station configures the terminal to use the DCI Format 1A to receive the PDSCH in the terminal specific search space or configures the terminal to use the DCI Format 1A to receive the PDSCH in a new carrier subframe or a subframe which does not have the CRS, the abovementioned specific information is used to indicate the terminal to use the CRS port or the DMRS port to perform the DMRS and/or PDSCH reception.

The embodiment of the present invention further provides a method for indicating antenna ports, comprising: when the base station configures the downlink control information format DCI Format 1A for the terminal, using the specified information to indicate the terminal to use which DMRS antenna port or DMRS antenna port group to perform the DMRS and/or PDSCH reception. Wherein, the DMRS antenna ports comprise: DMRS ports 7, 8 or antenna ports 9, 10. The DMRS antenna port groups comprise antenna port group 1 and antenna port group 2. The antenna port group 1 comprises antenna ports 7, 8, and the antenna port group 2 comprises antenna ports 9, 10.

When the base station configures the terminal to use the DCI Format 1A to receive the PDSCH in the terminal-specific search space or configure the terminal to use the DCI Format 1A to receive the PDSCH in a new carrier type subframe or a subframe which does not have the CRS, the specified information is used to indicate the terminal to use which DMRS antenna port or DMRS antenna port group to perform the DMRS and/or PDSCH reception.

The embodiment of the present invention further provides a method for indicating the number of transmission layers, comprising: when a base station configures the downlink control information format DCI Format 1A for a terminal, the base station uses specified information to indicate the number of DMRS transmission layers of the terminal.

When the base station configures the terminal to use the DCI Format 1A to receive the PDSCH in the terminal specific search space or configures the terminal to use the DCI Format 1A to receive the PDSCH in a new carrier type subframe or in a subframe which does not have the CRS, the specified information is used to indicate the number of DMRS transmission layers of the terminal.

The specified information in the abovementioned respective embodiments comprises at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

The embodiment of the present invention further provides a method for acquiring downlink control information, comprising: when a terminal obtains a plurality of sets of at least one of the following information through the terminal specific high-layer signaling:

a demodulation reference signal DMRS sequence initialization flag;

bandwidth information of a DMRS;

Qusi-Co-Location information of a DMRS;

information of a non-zero-power channel state information reference signal (NZP CSI-RS) configuration index to indicate a large-scale information correspondence between the DMRS and the NZP CSI-RS;

rate matching indication information;

then the terminal acquires the downlink control information format DCI Format 1A according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located;

to determine using which set in the abovementioned information configured by the terminal specific high-layer signaling to perform the DMRS and/or PDSCH reception.

When the terminal uses the DCI Format 1A to receive the PDSCH in the terminal-specific search space or uses the DCI Format 1A to receive the PDSCH in a new carrier type subframe or a subframe which does not have the CRS, it is to determine to use which set in the abovementioned information configured by the terminal specific high-layer signaling to perform the DMRS and/or PDSCH reception according to the localized/distributed virtual resource block assignment (LVRB/DVRB) bit in the DCI Format 1A.

When the terminal uses the DCI Format 1A to receive the PDSCH in the terminal specific search space, or, the terminal uses the DCI Format 1A to receive the PDSCH in a new carrier type subframe or a subframe which does not have the CRS, it is to determine that the terminal uses which set in the abovementioned information configured by the terminal specific high-layer signaling to perform the DMRS and/or PDSCH reception according to the control channel mode where the DCI Format 1A is located; or, when the terminal uses the DCI Format 1A to receive the PDSCH, it is to determine that the terminal uses which set in the abovementioned information configured by the terminal specific high-layer signaling to perform the DMRS and/or PDSCH reception according to the control channel mode where the DCI Format 1A is located.

When the terminal receives the DCI Format 1A on the PDCCH, it is to use related information of the access serving cell or use the first set in the abovementioned information configured by the terminal specific high-layer signaling to perform the DMRS and/or PDSCH reception; and/or, when the terminal receives the DCI Format 1A on the ePDCCH, the terminal uses one set in the abovementioned information configured by the terminal specific high-layer signaling to perform the DMRS and/or PDSCH reception.

The terminal determines the terminal to use which set in the abovementioned information configured by the terminal specific high-layer signaling to perform the DMRS and/or PDSCH reception according to the control channel mode where the DCI Format 1A is located and the LVRB/DVRB bit in the DCI Format 1A, comprising:

when the terminal uses the DCI Format 1A to receive the PDSCH in the terminal specific search space, or, when the terminal uses the DCI Format 1A to receive the PDSCH in a new carrier type subframe or a subframe which does not have the CRS, it is to determine the terminal using which set in the abovementioned information configured by the terminal specific high-layer signaling to perform the DMRS and/or PDSCH reception according to the control channel mode where the DCI Format 1A is located and the LVRB/DVRB bit in the DCI Format 1A; or, when the terminal uses the DCI Format 1A to receive the PDSCH, the control channel mode where the DCI Format 1A is located and the LVRB/DVRB bit in the DCI Format 1A are used to determine the terminal to use which set in the abovementioned information configured by the terminal specific high-layer signaling to perform the DMRS and/or PDSCH reception.

When the terminal receives the DCI Format 1A on the PDCCH, the terminal uses the related information of the access serving cell to perform the DMRS and/or PDSCH reception; or, uses the first set in the abovementioned information configured by the terminal specific high-layer signaling to perform the DMRS and/or PDSCH reception; or, uses the one, which is indicated by the LVRB/DVRB bit in the DCI Format 1A, in the two sets of the abovementioned information configured by the terminal specific high-layer signaling to perform the DMRS and/or PDSCH reception; and/or, when the terminal receives the DCI Format 1A on the ePDCCH, the DMRS and/or PDSCH reception is performed by using the one, which is indicated by the LVRB/DVRB bit in the DCI Format 1A, in the two sets of the abovementioned information configured by the terminal specific high-layer signaling.

The terminal determines the terminal using which set in the abovementioned information configured by the terminal specific high-layer signaling to perform the DMRS and/or PDSCH reception according to the configured ePDCCH transmission mode where the DCI Format 1A is located: diversity transmission mode and localized transmission mode, comprising:

when the ePDCCH transmission mode configured by the terminal is the diversity transmission mode, the terminal uses the first set in the abovementioned information configured by the terminal specific high-layer signaling to perform the DMRS and/or PDSCH reception;

when the ePDCCH transmission mode configured by the terminal is the localized transmission mode, the terminal uses the second set in the abovementioned information configured by the terminal specific high-layer signaling to perform the DMRS and/or PDSCH reception.

The terminal determines the terminal to use which set in the abovementioned information configured by the terminal specific high-layer signaling to perform the DMRS and/or PDSCH reception according to the configured ePDCCH transmission mode where the DCI Format 1A is located and the LVRB/DVRB bit in the DCI Format 1A, comprising:

when the ePDCCH transmission mode is the diversity transmission mode, the terminal using the first and second sets in the abovementioned information configured by the terminal specific high-layer signaling to perform the DMRS and/or PDSCH reception; and using the LVRB/DVRB bit in the DCI Format 1A to determine to use which set in the first and second sets to perform the DMRS and/or PDSCH reception;

when the ePDCCH transmission mode is the localized transmission mode, the terminal using the third and fourth sets in the abovementioned information configured by the terminal specific high-layer signaling to perform the DMRS and/or PDSCH reception, and using the DCI Format 1A LVRB/DVRB bit to determine to use which set in the third and fourth sets to perform the DMRS and/or PDSCH reception.

The terminal determines to use which set in the abovementioned information configured by the terminal specific high-layer signaling to perform the DMRS and/or PDSCH reception according to the configured ePDCCH cluster where the DCI Format 1A is located, comprising:

when the terminal detects that the ePDCCH is transmitted in the first cluster of the ePDCCH, the terminal using the first set in the abovementioned information configured by the terminal specific high-layer signaling to perform the DMRS and/or PDSCH reception;

when the terminal detects that the ePDCCH is transmitted in the second cluster of the ePDCCH, the terminal using the second set in the abovementioned information configured by the terminal specific high-layer signaling to perform the DMRS and/or PDSCH reception;

wherein, the terminal determines to use which set in the abovementioned information configured by the terminal specific high-layer signaling to perform the DMRS and/or PDSCH reception according to the configured ePDCCH cluster where the DCI Format 1A is located and the LVRB/DVRB bit in the DCI Format 1A, comprising:

when the terminal detects that the ePDCCH is transmitted in the first cluster of the ePDCCH, the terminal using the first and second sets in the abovementioned information configured by the terminal specific high-layer signaling to perform the DMRS and/or PDSCH reception; and using the DCI Format 1A LVRB/DVRB bit to determine to use which set in the first and second sets to perform the DMRS and/or PDSCH reception;

when the terminal detects that the ePDCCH is transmitted in the second cluster of the ePDCCH, the terminal using the third and fourth sets in the abovementioned information configured by the terminal specific high-layer signaling to perform the DMRS and/or PDSCH reception; and using the DCI Format 1A LVRB/DVRB bit to determine using which set in the third and fourth sets to perform the DMRS and/or PDSCH reception;

wherein, when the terminal does not acquire one of the following information through the terminal specific high-layer signaling:

a plurality of demodulation reference signal (DMRS) sequence initialization flags;
 bandwidth information of a plurality of DMRS;
 Qusi-Co-Location information of a plurality of DMRS;
 information of a plurality of non-zero-power channel state information reference signal (NZP CSI-RS) configuration indexes to indicate a large-scale information correspondence between the DMRS and the NZP CSI-RS;

a plurality of sets of rate matching indication information;

when the terminal uses the DCI Format 1A to receive the PDSCH in the terminal specific search space or uses the DCI Format 1A to receive the PDSCH in the new carrier type subframe or a subframe which does not have the CRS, the DMRS and/or PDSCH reception is performed in accordance with the identity, bandwidth information, large-scale information and rate matching information of the access serving cell during the synchronization.

The embodiment of the present invention further provides a method for determining antenna ports, comprising:

the terminal receiving the downlink control information format DCI Format 1A configured by the base station according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

to determine using a CRS port or a DMRS port to perform the DMRS and/or PDSCH reception.

The embodiment of the present invention further provides a method for determining antenna ports, comprising:

the terminal receiving the downlink control information format DCI Format 1A configured by the base station according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located.

to determine to use which DMRS antenna port or DMRS antenna port group to perform the DMRS and/or PDSCH reception.

The embodiment of the present invention further provides a method for determining the number of transmission layers, comprising:

the terminal receives the downlink control information format DCI Format 1A configured by the base station, and using at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located;

to determine the number of DMRS transmission layers of the terminal.

The downlink DMRS sequence initialization flag X is used to calculate the initial value $c_{init}$ for generating the downlink DMRS sequence, wherein the flag is equivalent to the $N_{ID}^{cell}$ in the equation 1, namely the flag is used to replace $N_{ID}^{cell}$.

In this application, the information or state which is indicated with the LVRB/DVRB and notified by the base station through the terminal specific high-layer signaling can be the information or state specially configured by the base station for the LVRB/DVRB, the information in the two states of the four states configured for the DCI Format 2D, or the information in the two of the four states configured through the terminal specific high-layer signaling.

The information in the following embodiments can be combined, for example, indication information 1 and 2 in the embodiment n
    indication information 3 and 4 in the embodiment n+1
    when combined,
    the configured information is information 5 (information 1+information 3)
    the configured information is information 6 (information 2+information 4)
and the LVRB/DVRB bit can be used to indicate the information 5 and the information 6.

The First Embodiment

Assume that the UE1 is a terminal with R11 or higher version, and the base station side configures the UE1 with two DMRS sequence initialization flags (X0, X1) through the UE-Specific high-layer signaling. When the base station configures the terminal to use the DCI Format 1A to indicate the terminal to receive the PDSCH in the terminal-specific search space, the LVRB/DVRB bit in the DCI Format 1A is used to indicate the terminal to use the above UE-Specific high-layer signaling to configure which one of the two DMRS sequence initialization flags at the terminal side to receive and process the DMRS and PDSCH. For example, when the value of LVRB/DVRB bit is 0, it is to indicate using the X0 to generate the DMRS sequence. When the value of LVRB/DVRB bit is 1, it is to indicate using the X1 to generate the DMRS sequence.

The UE1 determines to use which one of the two identity signalings configured by the high layer to generate the DMRS sequence sent by the base station side by detecting the LVRB/DVRB bit in the downlink control signaling DCI Format 1A. For example, when the value of LVRB/DVRB bit is 0, it is to indicate using the X0 to generate the DMRS sequence. When the value of LVRB/DVRB bit is 1, it is to indicate using the X1 to generate the DMRS sequence.

One range of values of the X0 and X1 is 0~503.

The Second Embodiment

Assume that the UE1 is a terminal with R11 or higher version, and the base station side configures the UE1 with two pieces of bandwidth information (S0, S1) through the UE-Specific high-layer signaling. When the base station configures the terminal to use the DCI Format 1A to indicate the terminal to receive the PDSCH in the terminal-specific search space, the LVRB/DVRB bit in the DCI Format 1A is used to indicate the terminal to use the above UE-Specific high-layer signaling to configure which one of the two pieces of bandwidth information (S0, S1) at the terminal side to receive and process the DMRS and PDSCH. For example, when the value of LVRB/DVRB bit is 0, it is to indicate using the S0 to generate the bandwidth information. When the value of LVRB/DVRB bit is 1, it is to indicate using the S1 to generate the bandwidth information.

The UE1 acquires which one of the two pieces of bandwidth information configured by the high layer is used to generate the DMRS and PDSCH sent by the base station side by detecting the LVRB/DVRB bit in the downlink control signaling DCI Format 1A. For example, when the value of LVRB/DVRB bit is 0, it is to indicate using the S0 to generate the bandwidth information. When the value of LVRB/DVRB bit is 1, it is to indicate using the S1 to generate the bandwidth information.

The bandwidth information of the S0 and S1 may at least comprise one of the following bandwidth information: 1.4M, 3M, 5M, 10M, 15M, and 20M.

The Third Embodiment

Assume that the UE1 is a terminal with R11 or higher version, and the base station side configures the UE1 with the Qusi-Co-Location information of DMRS through the UE-Specific high-layer signaling. When the base station configures the terminal to use the DCI Format 1A to indicate the terminal to receive the PDSCH in the terminal-specific search space, the LVRB/DVRB bit in the DCI Format 1A is used to indicate the terminal to use the above UE-Specific high-layer signaling to configure the terminal side to use the CRS large-scale information during the synchronization or the configured NZP CSI-RS large-scale information to demodulate the DMRS or receive the PDSCH. For example, when the value of LVRB/DVRB bit is 0, the CRS large-scale information during the synchronization is used to demodulate the DMRS or receive the PDSCH. When the value of LVRB/DVRB bit is 1, the configured NZP CSI-RS large-scale information is used to demodulate the DMRS or receive the PDSCH.

The UE1 acquires which piece of the Qusi-Co-Location information of DMRS configured by the high layer is used to generate the DMRS and PDSCH sent by the base station side by detecting the LVRB/DVRB bit in the downlink control signaling DCI Format 1A. For example, when the value of LVRB/DVRB bit is 0, it is to indicate using the CRS large-scale information during the synchronization to demodulate the DMRS or receive the PDSCH. When the value of LVRB/DVRB bit is 1, it is to indicate using the configured NZP CSI-RS large-scale information to demodulate the DMRS or receive the PDSC.

The large-scale information comprises one or more of the following information: delay spread, each path delay, Doppler frequency shift, frequency shift, Doppler spread and average reception power.

The Fourth Embodiment

Assume that the UE1 is a terminal with R11 or higher version, and the base station side configures the UE1 with large-scale information correspondences between the DMRS and two NZP CSI-RS through the UE-Specific high-layer signaling. When the base station configures the terminal to use the DCI Format 1A to indicate the terminal to receive the PDSCH in the terminal-specific search space, the LVRB/DVRB bit in the DCI Format 1A is used to indicate the terminal to use the above UE-Specific high-layer signaling to configure the terminal side to use which one of the two NZP CSI-RS large-scale information correspondences to demodulate the DMRS or receive the PDSC. For example, when the value of LVRB/DVRB bit is 0, the configured NZP CRS-RS large-scale information corresponding to the first NZP CSI-RS index is used to receive the DMRS and the PDSCH. When the value of LVRB/DVRB bit is 1, the configured NZP CRS-RS large-scale information corresponding to the second NZP CSI-RS index is used to receive the DMRS and the PDSCH.

The UE1 acquires that which one of the large-scale information correspondences between the DMRS and two NZP CSI-RS configured by the high layer is used for the DMRS and PDSCH sent by the base station side through detecting the LVRB/DVRB bit in the downlink control signaling DCI Format 1A. For example, when the value of LVRB/DVRB bit is 0, the configured NZP CRS-RS large-scale information corresponding to the first NZP CSI-RS index is used to receive the DMRS and the PDSCH. When the value of LVRB/DVRB bit is 1, the configured NZP CRS-RS large-scale information corresponding to the second NZP CSI-RS index is used to receive the DMRS and the PDSCH.

The large-scale information comprises one or more of the following information: delay spread, each path delay, Doppler frequency shift, frequency shift, Doppler spread and average reception power.

The Fifth Embodiment

Assume that the UE1 is a terminal with R11 or higher version, and the base station side configures two sets of rate matching information for the UE1 receiving the DMRS and the PDSCH through the UE-Specific high-layer signaling. When the base station configures the terminal to use the DCI Format 1A to indicate the terminal to receive the PDSCH in the terminal-specific search space, the LVRB/DVRB bit in the DCI Format 1A is used to indicate the terminal to use the above UE-Specific high-layer signaling to configure the terminal side to use which one of the two sets of rate matching information to receive the DMRS and/or PDSCH. For example, when the value of LVRB/DVRB bit is 0, the configured first set of rate matching information is used to map the PDSCH. When the value of LVRB/DVRB bit is 1, the configured second set of rate matching information is used to map the PDSCH.

The UE1 detects the LVRB/DVRB bit in the downlink control signaling DCI Format 1A to acquire that which one of the two sets of rate matching information is used for the DMRS and PDSCH sent by the base station side. For example, when the value of LVRB/DVRB bit is 0, the configured first set of rate matching information is used to receive the PDSCH. When the value of LVRB/DVRB bit is 1, the configured second set of rate matching information is used to receive the PDSCH.

The rate matching resource indication information comprises at least one of the following:
location information of a resource element on which rate matching or interference cancellation needs to be performed, start position of an orthogonal frequency division multiplexing (OFDM) symbol of the PDSCH, configuration condition of a multicast broadcast single frequency network (MBSFN) subframe corresponding to a resource location, the number of CRS ports, location information of CRS frequency-domain resource, cell identity, information of zero power CSI-RS configuration.

The Sixth Embodiment

When the base station side configures the terminal to use the DCI Format 1A to indicate the terminal to receive the PDSCH in the terminal specific search space on a non-MBSFN subframe, the LVRB/DVRB bit in the DCI Format 1A is used to indicate the terminal to use a CRS or DMRS port for the PDSCH reception. For example, when the value of LVRB/DVRB bit is 0, the CRS port is used to receive the PDSCH. When the value of LVRB/DVRB bit is 1, the DMRS port is used to receive the PDSCH.

By detecting the LVRB/DVRB bit in the downlink control signaling DCI Format 1A, the UE1 acquires whether the base station side uses the CRS or the DMRS to transmit the PDSCH. For example, when the value of LVRB/DVRB bit is 0, the CRS port is used to receive the PDSCH. When the value of LVRB/DVRB bit is 1, the DMRS port is used to receive the PDSCH.

The Seventh Embodiment

When the base station configures the terminal to use the DCI Format 1A to indicate the terminal to receive the PDSCH in the terminal specific search space, the LVRB/DVRB bit in the DCI Format 1A is used to indicate the terminal to use which one in the DMRS ports 7, 8 for the PDSCH reception. For example, when the value of LVRB/DVRB bit is 0, the DMRS port 7 is used to receive the PDSCH. When the value of LVRB/DVRB bit is 1, the DMRS port 8 is used to receive the PDSCH.

By detecting the LVRB/DVRB bit in the downlink control signaling DCI Format 1A, the UE1 acquires whether the base station side uses the DMRS port 7 or port 8 to transmit the PDSCH. For example, when the value of LVRB/DVRB bit is 0, the DMRS port 7 is used to receive the PDSCH. When the value of LVRB/DVRB bit is 1, the DMRS port 8 is used to receive the PDSCH.

The Eighth Embodiment

When the base station configures the terminal to use the DCI Format 1A to indicate the terminal to receive the PDSCH in the terminal specific search space, the LVRB/DVRB bit in the DCI Format 1A is used to indicate the terminal to use which one in the DMRS port 7 or a combination of the port 7 and the port 8 for the PDSCH reception. For example, when the value of LVRB/DVRB bit is 0, the DMRS port 7 is used to receive the PDSCH. When the value of LVRB/DVRB bit is 1, the DMRS ports 7 and 8 are used to receive the PDSCH.

By detecting the LVRB/DVRB bit in the downlink control signaling DCI Format 1A, the UE1 acquires whether the base station side uses the DMRS port 7 or the ports 7 and 8 to transmit the PDSCH. For example, when the value of LVRB/DVRB bit is 0, the DMRS port 7 is used to receive the PDSCH. When the value of LVRB/DVRB bit is 1, the DMRS ports 7 and 8 are used to receive the PDSCH.

When indicating the terminal to use the port 7 to receive the PDSCH, it is equivalent to the number of PDSCH transmission layers being one, and when indicating the terminal to use the ports 7 and 8 to receive the PDSCH, it is equivalent to the number of PDSCH transmission layers being two.

The Ninth Embodiment

Assume that the UE1 is a terminal with R11 or higher version, and the base station side configures the UE1 with two DMRS sequence initialization flags (X0, X1) through the UE-Specific high-layer signaling. When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the above UE-Specific high-layer signaling to configure which one of the two DMRS sequence initialization flags at the terminal side to receive and process the DMRS and PDSCH. For example, when the value of LVRB/DVRB bit is 0, it is to indicate using the X0 to generate the DMRS sequence. When the value of LVRB/DVRB bit is 1, it is to indicate using the X1 to generate the DMRS sequence.

By detecting the LVRB/DVRB bit in the downlink control signaling DCI Format 1A, the UE1 acquires which one in the two identity signalings configured by the high layer is used to generate the DMRS sequence sent by the base station side. For example, when the value of LVRB/DVRB bit is 0, it is to indicate using the X0 to generate the DMRS sequence. When the value of LVRB/DVRB bit is 1, it is to indicate using the X1 to generate the DMRS sequence.

The range of values of X0 and X1 is 0~503.

The Tenth Embodiment

Assume that the UE1 is a terminal with R11 or higher version, and the base station side configures the UE1 with two pieces of bandwidth information (S0, S1) through the UE-Specific high-layer signaling. When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the above UE-Specific high-layer signaling to configure which one of the two pieces of bandwidth information (S0, S1) at the terminal side to receive and process the DMRS and PDSCH. For example, when the value of LVRB/DVRB bit is 0, it is to indicate using the S0 to generate the bandwidth information. When the value of LVRB/DVRB bit is 1, it is to indicate using the S1 to generate the bandwidth information.

By detecting the LVRB/DVRB bit in the downlink control signaling DCI Format 1A, the UE1 determines which one of the two pieces of bandwidth information configured by the high layer is used to generate the DMRS and PDSCH sent by the base station side. For example, when the value of LVRB/DVRB bit is 0, it is to indicate using the S0 to generate the bandwidth information. When the value of LVRB/DVRB bit is 1, it is to indicate using the S1 to generate the bandwidth information.

The bandwidth information of the S0 and S1 may comprise at least one of the following bandwidth information: 1.4M, 3M, 5M, 10M, 15M and 20M.

The Eleventh Embodiment

Assume that the UE1 is a terminal with R11 or higher version, and the base station side configures the UE1 with the Qusi-Co-Location information of DMRS through the UE-Specific high-layer signaling. When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the above UE-Specific high-layer signaling to configure the terminal side to use the CRS large-scale information during the synchronization or the configured NZP CSI-RS large-scale information to demodulate the DMRS or receive the PDSC. For example, when the value of LVRB/DVRB bit is 0, the CRS large-scale information during the synchronization is used to demodulate the DMRS or receive the PDSCH. When the value of LVRB/DVRB bit is 1, the configured NZP CSI-RS large-scale information is used to demodulate the DMRS or receive the PDSCH.

By detecting the LVRB/DVRB bit in the downlink control signaling DCI Format 1A, the UE acquires which one of the Qusi-Co-Location information of DMRS configured by the high layer is used to generate the DMRS and PDSCH sent by the base station side. For example, when the value of LVRB/DVRB bit is 0, the CRS large-scale information during the synchronization is used to demodulate the DMRS or receive the PDSCH. When the value of LVRB/DVRB bit is 1, the configured NZP CSI-RS large-scale information is used to demodulate the DMRS or receive the PDSCH.

The large-scale information comprises one or more of the following information: delay spread, each path delay, Doppler frequency shift, frequency shift, Doppler spread and average receive power.

The Twelfth Embodiment

Assume that the UE is a terminal with R11 or higher version, and the base station side configures the UE1 with large-scale information correspondences between the UE1 DMRS and two NZP CSI-RS through the UE-Specific high-layer signaling. When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the above UE-Specific high-layer signaling to configure the terminal side to use which one of the two NZP CSI-RS large-scale information correspondences to demodulate the DMRS or receive the PDSCH. For example, when the value of LVRB/DVRB bit is 0, the configured NZP CSI-RS large-scale information corresponding to the first NZP CSI-RS index is used to receive the DMRS and the PDSCH. When the value of LVRB/DVRB bit is 1, the configured NZP CSI-RS large-scale information corresponding to the second NZP CSI-RS index is used to receive the DMRS and the PDSCH.

By detecting the LVRB/DVRB bit in the downlink control signaling DCI Format 1A, the UE acquires which one of the large-scale information correspondences between the DMRS and two NZP CSI-RS configured by the high layer is used for the DMRS and PDSCH sent by the base station side. For example, when the value of LVRB/DVRB bit is 0, the configured NZP CSI-RS large-scale information corresponding to the first NZP CSI-RS index is used to receive the DMRS and the PDSCH. When the value of LVRB/DVRB bit is 1, the configured NZP CSI-RS large-scale information corresponding to the second NZP CSI-RS index is used to receive the DMRS and the PDSCH.

The large-scale information comprises one or more of the following information: delay spread, each path delay, Doppler frequency shift, frequency shift, Doppler spread and average reception power.

The Thirteenth Embodiment

Assume that the UE is a terminal with R11 or higher version, and the base station side configures the UE with two sets of rate matching information for receiving the DMRS and PDSCH through the UE-Specific high-layer signaling. When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the above UE-Specific high-layer signaling to configure the terminal side to use which one in the two sets of rate matching information to receive DMRS and/or PDSCH. For example, when the value of LVRB/DVRB bit is 0, the configured first set of rate matching information is used to map the PDSCH. When the value of LVRB/DVRB bit is 1, the configured second set of rate matching information is used to map the PDSCH.

By detecting the LVRB/DVRB bit in the downlink control signaling DCI Format 1A, the UE acquires which one of the two sets of rate matching information is used for the DMRS and PDSCH sent by the base station side. For example, when the value of LVRB/DVRB bit is 0, the configured first set of rate matching information is used to receive the PDSCH. When the value of LVRB/DVRB bit is 1, the configured second set of rate matching information is used to receive the PDSCH.

The rate matching resource indication information comprises at least one of the following:

location information of a resource element on which rate matching or interference cancellation needs to be performed, start position of an orthogonal frequency division multiplexing (OFDM) symbol of the PDSCH, configuration condition of a multicast broadcast single frequency network (MBSFN) subframe corresponding to a resource location, the number of CRS ports, location information of CRS frequency-domain resource, cell identity, information of zero power CSI-RS configuration.

The Fourteenth Embodiment

When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use which one in the DMRS ports 7, 8 for the PDSCH reception. For example, when the value of LVRB/DVRB bit is 0, the DMRS port 7 is used to receive the PDSCH. When the value of LVRB/DVRB bit is 1, the DMRS port 8 is used to receive the PDSCH.

By detecting the LVRB/DVRB bit in the downlink control signaling DCI Format 1A, the UE acquires whether the base station side uses the DMRS port 7 or port 8 to send the PDSCH. For example, when the value of LVRB/DVRB bit is 0, the DMRS port 7 is used to receive the PDSCH. When the value of LVRB/DVRB bit is 1, the DMRS port 8 is used to receive the PDSCH.

The Fifteenth Embodiment

When the base station configures the terminal to use the DCI Format 1A to indicate the terminal to receive the PDSCH in a new carrier type subframe or a subframe which does not have the CRS, the LVRB/DVRB bit in the DCI Format 1A is used to indicate the terminal to use the DMRS port 7, or a combination of the port 7 and port 8 for the PDSCH reception. For example, when the value of LVRB/DVRB bit is 0, the DMRS port 7 is used to receive the PDSCH. When the value of LVRB/DVRB bit is 1, the DMRS ports 7 and 8 are used to receive the PDSCH.

By detecting the LVRB/DVRB bit in the downlink control signaling DCI Format 1A, the UE acquires whether the base station side uses the DMRS port 7 or the ports 7 and 8 to send the PDSCH. For example, when the value of LVRB/DVRB bit is 0, the DMRS port 7 is used to receive the PDSCH. When the value of LVRB/DVRB bit is 1, the DMRS ports 7 and 8 are used to receive the PDSCH.

When indicating the terminal to use the port 7 to receive the PDSCH, it is equivalent to the number of PDSCH transmission layers being one, and when indicating the terminal to use the ports 7 and 8 to receive the PDSCH, it is equivalent to the number of PDSCH transmission layers being two.

The Sixteenth Embodiment

When the base station indicates the terminal to use the DMRS to receive data in the PDSCH region and use the format 1A to perform the DCI configuration in the downlink control information of the terminal-specific search space, or a new carrier type subframe, or a subframe which does not have the CRS, it does not pre-use the terminal-specific high-layer signaling to configure at least one of the following information:

a plurality of DMRS initialization sequence flags X;
bandwidth information of a plurality of DMRSs;
Qusi-Co-Location information of a plurality of DMRSs;
information of a plurality of NZP CSI-RS configuration indexes to indicate large-scale information correspondences between the DMRS and the NZP CSI-RS;
a plurality of sets of rate matching indication information.

It is equivalent to indicating the terminal to perform the PDSCH reception in accordance with the ID, bandwidth information, large-scale information and rate matching information of the access serving cell during the synchronization and the DMRS port 7 or CRS.

The Seventeenth Embodiment

When the base station configures the terminal with the downlink control information format DCI Format 1A, the base station uses at least one of the following information:

the localized/distributed virtual resource block assignment (LVRB/DVRB) bit in the DCI Format 1A;
the control channel mode where the DCI Format 1A is located: PDCCH and ePDCCH;
the ePDCCH transmission mode where the DCI Format 1A is located: diversity transmission mode and localized transmission mode;
the ePDCCH cluster where the DCI Format 1A is located.

to indicate the terminal to use which set of the downlink control information to perform the DMRS reception and/or PDSCH reception.

The terminal uses the terminal specific high-layer signaling to acquire at least one of the following downlink control information configured by the base station:

a plurality of DMRS sequence initialization flags X;
bandwidth information of a plurality of DMRSs;
Qusi-Co-Location information of a plurality of DMRSs;
Information of a plurality of NZP CSI-RS configuration indexes to indicate large-scale information correspondences between the DMRS and the NZP CSI-RS;
a plurality of sets of rate matching indication information;

then the terminal acquires the downlink control information format DCI Format 1A, and according to at least one of the following information:

the localized/distributed virtual resource block assignment (LVRB/DVRB) bit in the DCI Format 1A;
the control channel mode where the DCI Format 1A is located: PDCCH and ePDCCH;
the ePDCCH transmission mode where the DCI Format 1A is located: diversity transmission mode and localized transmission mode;
the ePDCCH cluster where the DCI Format 1A is located.

determine using which of the abovementioned information configured by the terminal specific high-layer signaling to perform the DMRS and/or PDSCH reception.

The Eighteenth Embodiment

When the base station configures the terminal with the downlink control information format DCI Format 1A, the base station uses the control channel mode where the DCI Format 1A is located: PDCCH and ePDCCH, to indicate the terminal to use which set of downlink control information to receive the PDSCH.

The terminal acquires the DCI Format 1A through detecting in the PDCCH region or the ePDCCH region to determine to use which set of downlink control information to receive the PDSCH.

For example, when the base station configures the terminal to use the PDCCH to transmit the DCI Format 1A, it is equivalent to indicating the terminal to use the downlink control information of the access serving cell for the PDSCH reception. When the terminal configures the terminal to use the ePDCCH to transmit the DCI Format 1A, it is equivalent to indicating the terminal to use one set of downlink control information configured by the high layer to receive the PDSCH.

When the terminal detects the DCI Format 1A in the PDCCH region, the terminal uses control information of the access serving cell to perform the PDSCH reception. When the terminal detects the DCI Format 1A in the ePDCCH region, the terminal uses one set of downlink control information configured by the high layer for the PDSCH reception.

The downlink control information comprises at least one of the following information:
a plurality of DMRS sequence initialization flags X;
bandwidth information of a plurality of DMRSs;
Qusi-Co-Location information of a plurality of DMRSs;
information of a plurality of NZP CSI-RS configuration indexes to indicate the large-scale information correspondence between the DMRS and the NZP CSI-RS;
a plurality of sets of rate matching indication information.
antenna port indication of DMRS;
indication of the number of PDSCH transmission layers;
use the CRS demodulation or the DMRS demodulation.

The Nineteenth Embodiment

When the base station configures the terminal with the downlink control information format DCI Format 1A, the base station uses the control channel mode where the DCI Format 1A is located: PDCCH and ePDCCH, and the DVRB/LVRB to indicate the terminal to use which set of control information to receive the PDSCH.

The terminal acquires the DCI Format 1A by detecting in the PDCCH region or the ePDCCH region to determine to use which set of control information to receive the PDSCH.

For example, when the base station configures the terminal to use the PDCCH to transmit the DCI Format 1A, it is equivalent to indicating the terminal to use the control information of the access serving cell for the PDSCH reception. When the terminal configures the terminal to use the ePDCCH to transmit the DCI Format 1A, it is equivalent to indicating the terminal to use two sets of control information configured by the high layer to receive the PDSCH, and then use the LVRB/DVRB bit in the DCI Format 1A to indicate the terminal to use which one in the two sets to receive the PDSCH.

When the terminal detects the DCI Format 1A in the PDCCH region, the terminal uses control information of the access serving cell to perform the PDSCH reception. When the terminal detects the DCI Format 1A in the ePDCCH region, the terminal uses the two sets of control information configured by the high layer for the PDSCH reception, and then detects the LVRB/DVRB bit in the DCI Format 1A to determine the terminal to use which one in the two sets to receive the PDSCH.

The downlink control information at least comprises one of the following information:
a plurality of DMRS sequence initialization flags X;
bandwidth information of a plurality of DMRSs;
Qusi-Co-Location information of a plurality of DMRSs;
information of a plurality of NZP CSI-RS configuration indexes to indicate the large-scale information correspondence between the DMRS and the NZP CSI-RS;
a plurality of sets of rate matching indication information.
antenna port indication of DMRS;
indication of the number of PDSCH transmission layers;
use the CRS demodulation or the DMRS demodulation.

The Twentieth Embodiment

The base station configures the terminal with the ePDCCH transmission mode where the DCI Format 1A is located: diversity transmission mode and localized transmission mode, to indicate the terminal to use which DMRS antenna port or DMRS antenna port group for the DMRS reception and/or PDSCH reception.

The terminal determines to use which set of downlink control information to receive the PDSCH according to whether the DCI Format 1A uses the diversity transmission or localized transmission of ePDCCH.

For example, when the base station configures the terminal to use the diversity transmission mode of ePDCCH to transmit the DCI Format 1A, it is equivalent to configuring the terminal to use the first set of downlink control information to receive the PDSCH, and when the base station configures the terminal to use the localized transmission mode of ePDCCH to transmit the DCI Format 1A, it is equivalent to configuring the terminal to use the second set of downlink control information to receive the PDSCH.

When the terminal uses the diversity transmission mode of EPCCCH to detect the DCI Format 1A, the first set of downlink control information is used, and when the terminal uses the localized transmission mode of EPCCCH to detect the DCI Format 1A, the second set of downlink control information is used.

The downlink control information comprises at least one of the following information:
a plurality of DMRS sequence initialization flags X;
bandwidth information of a plurality of DMRSs;
Qusi-Co-Location information of a plurality of DMRSs;
information of a plurality of NZP CSI-RS configuration indexes to indicate a large-scale information correspondence between the DMRS and the NZP CSI-RS;
a plurality of sets of rate matching indication information.
antenna port indication of DMRS;
indication of the number of PDSCH transmission layers;
use the CRS demodulation or the DMRS demodulation.

The Twenty-First Embodiment

The base station configures the terminal with the ePDCCH cluster for indicating the terminal to use which set of downlink control information to perform the PDSCH reception. The terminal detects the DCI Format 1A within the ePDCCH cluster to determine the terminal to use which set of downlink control information to receive the PDSCH.

For example: the base station configures the terminal with two sets of ePDCCH detection clusters, when the base station configures the DCI Format 1A of the terminal in the first ePDCCH cluster, it is equivalent to indicating the terminal to use the first set in the two sets of downlink control information configured by the terminal high-layer signaling to receive the PDSCH. When the base station configures the DCI Format 1A of the terminal in the second ePDCCH cluster, it is equivalent to indicating the terminal to use the second set in the two sets of downlink control information configured by the terminal high-layer signaling to receive the PDSCH.

When the terminal detects that the DCI Format 1A is located in the first ePDCCH cluster, the terminal uses the first set in the two sets of downlink control information configured by the terminal high-layer signaling to receive the PDSCH, and when the terminal detects that the DCI Format 1A is located in the second ePDCCH cluster, the terminal uses the second set in the two sets of downlink control information configured by the terminal high-layer signaling to receive the PDSCH.

Each set of the downlink control information at least comprises one of the following information:

a plurality of DMRS sequence initialization flags X;
bandwidth information of a plurality of DMRSs;
Qusi-Co-Location information of a plurality of DMRSs;
information of a plurality of NZP CSI-RS configuration indexes to indicate a large-scale information correspondence between the DMRS and the NZP CSI-RS;
a plurality of sets of rate matching indication information.
antenna port indication of DMRS;
indication of the number of PDSCH transmission layers;
use the CRS demodulation or the DMRS demodulation.

The Twenty-Second Embodiment

The base station configures the terminal with an ePDCCH cluster to indicate the terminal to use which set of downlink control information for the PDSCH reception. The terminal detects the DCI Format 1A within the ePDCCH cluster to determine the terminal to use which set of downlink control information to receive the PDSCH.

For example: the base station configures the terminal with two sets of ePDCCH clusters, and the base station respectively and independently configures the two ePDCCH clusters with downlink control information, when the base station configures the DCI Format 1A of the terminal in the first ePDCCH cluster, it is equivalent to indicating the terminal to use the downlink control information configured by the first ePDCCH cluster, and when the base station configures the DCI Format 1A of the terminal in the second ePDCCH cluster, it is equivalent to indicating the terminal to use the downlink control information configured by the second ePDCCH cluster to receive the PDSCH.

When the terminal detects that the DCI Format 1A is located in the first ePDCCH cluster, the terminal uses the downlink control information configured by the first ePDCCH cluster to receive the PDSCH, and when the terminal detects that the DCI Format 1A is located in the second ePDCCH cluster, the terminal uses the downlink control information configured by the second ePDCCH cluster to receive the PDSCH.

Each set of the downlink control information comprises at least one of the following information:

a plurality of DMRS sequence initialization flags X;
bandwidth information of a plurality of DMRSs;
Qusi-Co-Location information of a plurality of DMRSs;
information of a plurality of NZP CSI-RS configuration indexes to indicate a large-scale information correspondence between the DMRS and the NZP CSI-RS;
a plurality of sets of rate matching indication information.
antenna port indication of DMRS;
indication of the number of PDSCH transmission layers;
use the CRS demodulation or the DMRS demodulation.

The embodiment of the present invention further provides a base station, as shown in FIG. 1, comprising:

a configuration unit, configured to configure the terminal with a plurality of sets of at least one of the following information through the terminal-specific high-layer signaling:

a plurality of demodulation reference signal (DMRS) sequence initialization flags;
bandwidth information of a plurality of DMRSs;
Qusi-Co-Location information of a plurality of DMRSs;
information of a plurality of non-zero power channel state information reference signal (NZP CSI-RS) configuration indexes to indicate the large-scale information correspondence between the DMRS and the NZP CSI-RS;
a plurality of sets of rate matching indication information;

an indication unit, configured to use at least one of the following information when configuring the terminal with the downlink control information format DCI Format 1A:

the localized/distributed virtual resource block assignment (LVRB/DVRB) bit in the DCI Format 1A;
the control channel mode where the DCI Format 1A is located: PDCCH and ePDCCH;
the ePDCCH transmission mode where the DCI Format 1A is located: diversity transmission mode and localized transmission mode;
the ePDCCH cluster where the DCI Format 1A is located;
to indicate the terminal to use which set of the above-mentioned information configured by the terminal-specific high layer signaling to perform the DMRS and/or PDSCH reception.

The embodiment of the present invention further provides a base station, comprising:

a configuration unit, configured to use at least one of the following information when configuring the terminal with the downlink control information format DCI Format 1A:

the localized/distributed virtual resource block assignment (LVRB/DVRB) bit in the DCI Format 1A;
the control channel mode where the DCI Format 1A is located: PDCCH and ePDCCH;
the ePDCCH transmission mode where the DCI Format 1A is located: diversity transmission mode and localized transmission mode;
the ePDCCH cluster where the DCI Format 1A is located;
to indicate the terminal to use the CRS port or the DMRS port to perform the DMRS and/or PDSCH reception.

The embodiment of the present invention further provides a base station, comprising:

a configuration unit, configured to use at least one of the following information when configuring the terminal with the downlink control information format DCI Format 1A:

the localized/distributed virtual resource block assignment (LVRB/DVRB) bit in the DCI Format 1A;
the control channel mode where the DCI Format 1A is located: PDCCH and ePDCCH;
the ePDCCH transmission mode where the DCI Format 1A is located: diversity transmission mode and localized transmission mode;
the ePDCCH cluster where the DCI Format 1A is located;
to indicate the terminal to use which DMRS antenna port or DMRS antenna port group to perform the DMRS reception and/or PDSCH reception.

The embodiment of the present invention further provides a base station, comprising:

a configuration unit, configured to use at least one of the following information when configuring the terminal with the downlink control information format DCI Format 1A:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located;

to indicate the number of DMRS transmission layers for the terminal.

Figure 2:
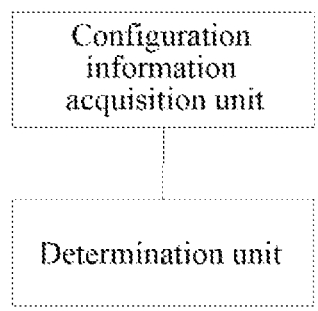
FIG. 2 is a block diagram of a terminal in accordance with an embodiment of the present invention.

The embodiment of the present invention further provides a terminal, as shown in FIG. 2, comprising:

a configuration information acquisition unit, configured to acquire a plurality of sets of at least one of the following information configured by the base station through the terminal specific high-layer signaling:

a plurality of demodulation reference signal (DMRS) sequence initialization flags;

bandwidth information of a plurality of DMRSs;

Qusi-Co-Location information of a plurality of DMRSs;

information of a plurality of non-zero power channel state information reference signal NZP CSI-RS configuration indexes to indicate the large-scale information correspondence between the DMRS and the NZP CSI-RS;

a plurality of sets of rate matching indication information; and, acquire the downlink control information format DCI Format 1A;

a determining unit, configured to, according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located;

determine to use which set in the abovementioned information configured by the terminal specific high-layer signaling to perform the DMRS and/or PDSCH reception.

The determination unit is further configured to: when the configuration information acquisition unit does not acquire one of the following information through the terminal specific high-layer signaling:

a plurality of demodulation reference signal DMRS sequence initialization flags;

bandwidth information of a plurality of DMRSs;

Qusi-Co-Location information of a plurality of DMRSs;

information of a plurality of non-zero power channel state information reference signal (NZP CSI-RS) configuration indexes to indicate the large-scale information correspondence between the DMRS and the NZP CSI-RS;

a plurality of sets of rate matching indication information;

when using the DCI Format 1A to receive the PDSCH in the terminal specific search space or using the DCI Format 1A to receive the PDSCH in a new carrier type subframe or a subframe which does not have the CRS, the DMRS and/or PDSCH reception is performed according to the identity, bandwidth information, large-scale information and rate matching information of the access serving cell during the synchronization.

The embodiment of the present invention further provides a terminal, as shown in FIG. 2, comprising:

a configuration information acquisition unit, configured to receive a downlink control information format DCI Format 1A configured by a base station;

a determination unit, configured to, according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located;

determine to use a CRS port or a DMRS port to perform the DMRS and/or PDSCH reception.

The embodiment of the present invention further provides a terminal, as shown in FIG. 2, comprising:

a configuration information acquisition unit, configured to receive the downlink control information format DCI Format 1A configured by the base station;

a determination unit, configured to, according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located, determine to use which DMRS antenna port or DMRS antenna port group to perform the DMRS and/or PDSCH reception.

The embodiment of the present invention further provides a terminal, as shown in FIG. 2, comprising:

a configuration information acquisition unit, configured to receive the downlink control information format DCI Format 1A configured by the base station;

a determining unit, configured to, according to at least one of the following information:

the localized/distributed virtual resource block assignment (LVRB/DVRB) bit in the DCI Format 1A;

the control channel mode where the DCI Format 1A is located: PDCCH and ePDCCH;

the ePDCCH transmission mode where the DCI Format 1A is located: diversity transmission mode and localized transmission mode;

the ePDCCH cluster where the DCI Format 1A is located, determine the number of DMRS transmission layers of the terminal.

The Twenty-Third Embodiment

When the interference measurement resources (IMR) configured by the terminal appear on the scheduling PDSCH subframe, and the corresponding IMR are not included in the available ZP (Zero power) CSI-RS configuration in the current subframe, the terminal does not perform the interference measurement in the resource block where the IMR collides with the PDSCH.

The Twenty-Fourth Embodiment

The interference measurement resources (IMR) configured by the terminal appear on the scheduling PDSCH subframe and the corresponding IMR are not included in the available ZP CSI-RS configuration of the current subframe, the terminal does not perform the interference measurement on the sub frame.

The Twenty-Fifth Embodiment

Through the terminal-specific high-layer signaling, the base station independently configures each ePDCCH cluster of the terminal with:

ePDCCH bandwidth information or bandwidth information corresponding to the EPDCCH DMRS;

the terminal receives bandwidth information of each ePDCCH cluster or the DMRS bandwidth information corresponding to the EPDCCH configured by the base station high layer signaling.

Preferably, the base station can generate the EPDCCH resources in accordance with the configured EPDCCH bandwidth information and send the EPDCCH resources to the terminal, or the base station may generate the EPDCCH DMRS according to the configured EPDCCH DMRS bandwidth information, and send the EPDCCH DMRS to the terminal.

By receiving the bandwidth information corresponding to various ePDCCH clusters or the DMRS bandwidth information corresponding to the ePDCCH clusters and configured by the base station high layer signaling, the terminal receives the EPDCCH.

It should be noted that various details described in the abovementioned method embodiment are equally applicable to the apparatus embodiment, and therefore repeated description of the same or similar parts is omitted herein.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

The above description includes preferred embodiments of the patent document and is not used to limit the patent document, and for a person skilled in the art, the patent document can have various modifications and changes. Any modifications, equivalent replacements and improvements made within the spirit and principle of the patent document should be included within the protection scope of the present document.

INDUSTRIAL APPLICABILITY

With the scheme in the embodiment of the present invention, the purpose of orthogonality and quasi-orthogonality (interference randomization) of the CoMP technology can be guaranteed and the purpose of cell division can also be reached in the scenario of Scenario 4 on the premise of not changing the existing DCI-Format. In addition, the bandwidth notification method in the embodiment of the present invention can support data transmission and reception in the assumption of different bandwidth, different rate matching information and large-scale information, and can achieve the purposes of increasing cell division gain, reducing interference and saving energy.

What is claimed is:

1. An interference measurement method, comprising:
   configuring, by a terminal, interference measurement resources (IMR); and
   determining, by the terminal, that the IMR appear on a scheduling physical downlink shared channel (PDSCH) subframe, and corresponding IMR are not contained in an available zero power channel state information reference signal (ZP CSI-RS) configuration of a current subframe; the terminal not performing an interference measurement in a resource block in which the IMR collides with the scheduling PDSCH subframe.

2. An interference measurement method, comprising:
   configuring, by a terminal, interference measurement resources (IMR); and
   determining, by the terminal, that the IMR appear on a scheduling physical downlink shared channel (PDSCH) subframe and corresponding IMR are not included in an available zero power channel state information reference signal (ZP CSI-RS) configuration of a current subframe; the terminal not performing an interference measurement on the scheduling PDSCH subframe.

* * * * *